(12) United States Patent
Wang et al.

(10) Patent No.: US 11,271,997 B2
(45) Date of Patent: Mar. 8, 2022

(54) APPLICATION RESOURCE ALLOCATION FOR WIRELESS SERVICES

(71) Applicant: AT&T Intellectual Property I, L.P., Atlanta, GA (US)

(72) Inventors: Jiansong Wang, Lincroft, NJ (US); Joseph Mueller, Ravensdale, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/791,447

(22) Filed: Feb. 14, 2020

(65) Prior Publication Data

US 2021/0258374 A1 Aug. 19, 2021

(51) Int. Cl.
*H04L 29/08* (2006.01)
*H04W 4/029* (2018.01)
*H04W 88/16* (2009.01)
*H04W 64/00* (2009.01)
*H04L 67/1021* (2022.01)
*H04L 67/14* (2022.01)

(52) U.S. Cl.
CPC .......... *H04L 67/1021* (2013.01); *H04L 67/14* (2013.01); *H04W 4/029* (2018.02); *H04W 64/003* (2013.01); *H04W 88/16* (2013.01)

(58) Field of Classification Search
CPC .......... H04W 36/00837; H04W 24/02; H04W 36/14; H04W 36/30; H04W 36/24; H04W 88/06; H04W 36/08; H04W 36/0016; H04W 36/0061; H04W 36/0094; H04W 36/0085; H04W 36/0083; H04W 72/048; H04W 36/00; H04W 28/24; H04W 36/0011; H04W 52/0264; H04W 16/14; H04W 24/04; H04W 36/18; H04W 36/26
See application file for complete search history.

(56) References Cited

U.S. PATENT DOCUMENTS

| 2013/0107790 | A1* | 5/2013 | Lee | H04W 72/1247 370/312 |
| 2013/0155889 | A1* | 6/2013 | Brownworth | H04L 61/1529 370/252 |
| 2015/0237552 | A1* | 8/2015 | White | H04W 36/30 370/331 |

* cited by examiner

*Primary Examiner* — Kwasi Karikari
(74) *Attorney, Agent, or Firm* — Amin, Turocy & Watson, LLP

(57) ABSTRACT

Connecting user equipment (UE) to an application can be managed based on UE movement and location. During data session between UE and application, a communication management component (CMC) associated with anchor network component (ANC) or serving network component (SNC) determines UE location, and connects UE to the ANC and SNC, which enables access of the application via a data network associated with ANC. As UE moves, CMC tracks UE movement and communication conditions. If, when UE is at second location, a communication condition breaches threshold level, CMC determines whether interruption of the data session is permitted. If not, CMC determines whether there is a local SNC in proximity to second location. If there is, CMC can switch UE from SNC to local SNC, which can access local application content via local data network associated with application. If interruption permitted, UE deactivates and reactivates to connect to local ANC.

20 Claims, 9 Drawing Sheets

APPLICATION RESOURCE ALLOCATION FOR WIRELESS SERVICES

TECHNICAL FIELD

This disclosure relates generally to wireless communications, e.g., to application resource allocation for wireless services.

BACKGROUND

Communication devices can communicate data with other communication devices via a communication network. For example, a wireless device (e.g., mobile, cell, or smart phone; or electronic tablet or pad) can connect to and communicate with a wireless communication network (e.g., core network), via a base station associated with the wireless communication network, to communicate with another communication device (e.g., another mobile phone, an application server, or a computer) connected to the wireless communication network or to another communication network (e.g., Internet Protocol (IP)-based network, such as the Internet) associated with (e.g., communicatively connected to) the wireless communication network. The wireless device can, for instance, communicate information to a base station and associated wireless communication network (e.g., core network) via an uplink and can receive information from the base station (and associated wireless communication network) via a downlink.

The above-described description is merely intended to provide a contextual overview regarding wireless communications, and is not intended to be exhaustive.

DETAILED DESCRIPTION

Figure 1:
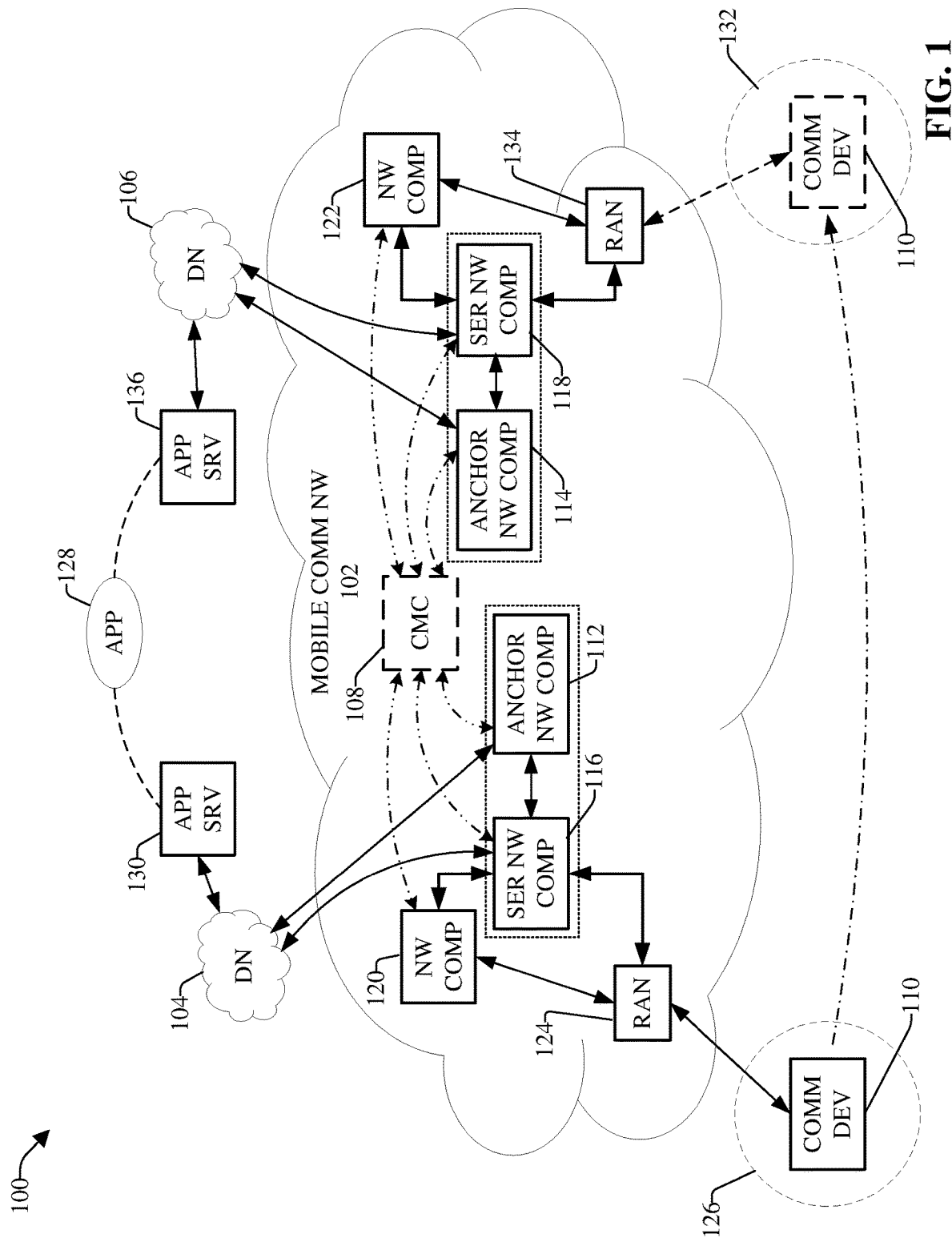
FIG. 1 illustrates a block diagram of an example system that can manage connection of communication devices with anchor network components, serving network components, and other components or devices of or associated with a communication network, and routing of data traffic, in connection with use of applications by communication devices including while communication devices are moving, in accordance with various aspects and embodiments of the disclosed subject matter.

Various aspects and embodiments of the disclosed subject matter are now described with reference to the drawings, wherein like reference numerals are used to refer to like elements throughout. In the following description, for purposes of explanation, numerous specific details are set forth in order to provide a thorough understanding of one or more aspects and embodiments. However, the various aspects and embodiments can be practiced without these specific details (and without applying to any particular network environment or standard). In other instances, well-known structures and devices are shown in block diagram form in order to facilitate describing one or more aspects or embodiments.

Discussed herein are various aspects that relate to application resource allocation (e.g., dynamic application resource allocation) for wireless services.

The disclosed subject matter can significantly improve application resource allocation for wireless services, improve communication of information between wireless communication devices and a communication network, and improve network efficiency associated with the communication network.

Various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for reducing interference on reference signals from other co-channel reference signals, and improving the channel estimation performance for CSI estimation and data detection, in 5G systems, and other next generation systems, can be desired. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also will employ massive MIMO systems (e.g., hundreds of antennas at the transmitter side and receiver side). Typically, with a $(N_t, N_r)$, where $N_t$ denotes the number of transmit antennas and $N_r$ denotes the number of receive antennas, the peak data rate can multiply with a factor of $N_t$ over single antenna systems in a rich scattering environment.

Communication devices can communicate information (e.g., voice and/or data traffic) to other communication devices via a communication network, which can comprise a core network that can operate to enable wireless communication between communication devices. For example, a wireless phone (e.g., mobile, cell, or smart phone; or electronic tablet or pad) can connect to and communicate with a wireless communication network (e.g., core network) to communicate with another communication device (e.g., another mobile phone, an application server, or a computer) connected to the wireless communication network or to another communication network (e.g., Internet Protocol (IP)-based network, such as the Internet) associated with (e.g., communicatively connected to) the wireless communication network.

With the advancement of the wireless technologies, such as, for example, LTE advanced and 5G RAN, edge computing can be the next wireless industry revolution which will impact many aspects of people's lives. Ultra-low latency applications and/or interactive contents can be the driving forces for improved and/or increased wireless business, including new revenue streams for the wireless business, in the future. Therefore, it can be desirable to have a new and enhanced wireless network architecture that can desirably support edge computing applications while users and their communication devices are mobile.

Based on current 3GPP standards, when a mobile data session is created, the mobile data session can be anchored on a packet data network (PDN) gateway (PGW). The PGW can be the gateway between a mobile core network and external packet data networks (e.g., Internet). Conventionally, regardless of where a communication device has moved, the normal mobile data flows have to go back to this PGW in order to exit out of the mobile core network to an external packet data network. This can mean that, when a user using a communication device creates a mobile data session in New York City, this data session can be stuck on the PGW in New York City even if the user and communication device travel all the way to Los Angeles, even though there can be another PGW in, or significantly closer to, Los Angeles. This can mean that the user may not be able to enjoy the local contents at Los Angeles while the PGW is in New York City, and/or even with regard to user requests for local contents, the IP routing relating to the requests for local contents would cross the country twice between Los Angeles and New York City. Certainly, such a latency cannot be tolerated by many types of applications, including typical edge computing applications. The current approach is that either the user realizes the application performance is degrading and manually restarts the communication device or the service provider (e.g., customer representatives of the service provider) may prompt the user to restart the communication device. This is not a desirable customer experience. It can be desirable to create an enhanced and superior customer experience while providing desirable (e.g., superior) edge Computing services.

To that end, presented are techniques for managing connection of a communication device with an anchor network component(s) (e.g., PGW, or user plane function (UPF) acting as an anchor point and/or serving gateway), serving network component(s) (e.g., SGW, or UPF acting as a serving gateway), and other components or devices of or associated with a communication network, and routing of data traffic, in connection with use of an application by the communication device while the communication device is moving.

The disclosed subject matter can comprise a communication management component (CMC) that can manage connections of communication devices with anchor network components, serving network components, and other components or devices of or associated with the communication network, and routing of data traffic associated with the communication devices, in connection with use of applications by the communication devices while the communication devices are moving, in accordance with defined communication management criteria. The CMC can be part of or associated with the communication network (e.g., mobile communication network). In accordance with various embodiments, the CMC can be part of an anchor network component, a serving network component, or another network component (e.g., a mobility management node function, such as mobility management entity (MME) component or access and mobility management function (AMF) component) of the communication network (e.g., mobile core network of the communication network), or can be a distinct component of the communication network.

When the communication device is activated (e.g., turned to an on state, or otherwise activated), while located in a first location, the CMC can determine the first location of the communication device based at least in part on the results of analyzing first location information (e.g., tracking area information, cell location information, registration area information, or geo-location information) associated with the communication device, wherein the first location information can indicate that the communication device is in the first location. The CMC can determine a first anchor network component (e.g., first PGW or first UPF) and first serving network component (e.g., first SGW, or the first UPF, which can include serving gateway functionality) that are located in proximity to the first location and can provide coverage (e.g., wireless coverage) for the first location (e.g., coverage for a first region comprising the first location). The CMC can connect or facilitate connecting the communication device to the first serving network component and first anchor network component. The first anchor network component can be associated with (e.g., communicatively connected to) a first data network (e.g., first packet data network), and a first application server associated with the application can be associated with the first data network. The communication device can access and utilize the application by communicating with the first application server via the first data network, first anchor network component, and first serving network component, wherein a data session (e.g., mobile data session) can be established between the communication device and first application server.

As the communication device moves, the CMC can track and determine movement and communication conditions (e.g., jitter, latency, data packet loss, and/or throughput of communications) of or associated with the communication device based at least in part on location information and communication conditions information associated with the communication device. For instance, the CMC can determine when the communication device is at a second location based at least in part on the results of analyzing second communication information associated with the communication device, wherein the second location information can indicate that the communication device is in the second location.

If, when the communication device is at the second location, the CMC determines that a communication condition associated with the communication device (e.g., associated with the data session of the communication device) has breached a defined threshold value (e.g., amount, level, number, or percentage) applicable with respect to the communication condition, based at least in part on the results of analyzing communication conditions information associated with the communication device, the CMC can determine whether to change the serving network component and/or anchor network component for the communication device, in accordance with defined communication management criteria, to facilitate improving communication conditions associated with the communication device and/or data session.

In some embodiments, the CMC can determine whether an interruption of the data session for up to a defined period of time is permitted, based at least in part on the results of analyzing a set of preferences (e.g., service continuity preferences) associated with the communication device and/or a set of characteristics associated with the application. If the CMC determines that such an interruption of the data session is not permitted, the CMC can determine whether there is a second (e.g., local) serving network component in proximity to the second location that can serve the communication device with regard to the data session with the application. In this regard, the CMC also can determine whether there is a second data network and second application server associated with the application in proximity (e.g., relative proximity) to the second location, wherein the second data network can be associated with the second serving network component and the second application server.

In response to determining that there is a second serving network component (and second data network and second application server) in proximity to the second location that can serve the communication device with regard to the data session with the application, the CMC can switch or facilitate switching the communication device from being connected to and/or served by the first serving network component to being connected to and/or served by the second serving network component (e.g., second SGW, or second UPF), as more fully described herein. The communication device can continue to be associated with the first anchor network device with respect to the data session, and the first anchor network device can continue to be the data session anchor (e.g., mobile data session anchor), however, data traffic for the data session does not have to be routed through the first anchor network device. In some embodiments, when UPFs are employed in the communication network, the second UPF (e.g., a second UPF comprising a serving gateway (e.g., the second serving network component) as well as a second packet data gateway), in proximity to the second location, can be inserted into the communication path associated with the communication device, and the first UPF (e.g., first UPF comprising a first packet data network gateway (e.g., the first anchor network component) as well as a first serving gateway) can remain in the communication path at least to continue to act as a mobility anchor for the data session. In certain embodiments, the second serving network component can be enhanced to be able to comprise at least some packet data gateway functions that can enable the second serving network component to access and communicate with the second data network to communicate data traffic between the communication device and second application server, without any of such data traffic having to be routed through the first anchor network component. For instance, the second serving network component can provide a local data traffic offload without the data traffic flow of the data session reaching the first anchor network component.

In some embodiments, alternatively or additionally, if the CMC determines that an interruption of the data session for up to the defined period of time is permitted, and if the CMC determines that there is a second anchor network component in relative proximity to the second location (e.g., as compared to the first anchor network component), the CMC can determine that the communication device can be switched from the first anchor network component to the second anchor network component. The CMC can communicate a request message to the communication device, wherein the request message can request that the communication device deactivate, to facilitate terminating a first connection with the first anchor network component and terminate the data session, and reactivate to connect the communication device with the second anchor network component to initiate and/or establish a second data session between the communication device and the second application server associated with the application. In response to the request message, the communication device can deactivate to facilitate terminating the first connection with the first anchor network component and terminating the data session, and can reactivate to initiate and/or establish a second connection with the second anchor network component, and can initiate and/or establish the second data session between the communication device and the second application server. In connection with connecting to the second anchor network component, the communication device also can be connected to the second serving network component.

These and other aspects and embodiments of the disclosed subject matter will now be described with respect to the drawings.

Referring now to the drawings, FIG. 1 illustrates a block diagram of an example system 100 that can manage connection of communication devices with anchor network components (e.g., PGWs, or UPFs acting as an anchor point and/or serving gateway), serving network components (e.g., SGWs, or UPFs acting as a serving gateway), and other components or devices of or associated with a communication network, and routing of data traffic, in connection with use of applications by communication devices including while communication devices are moving, in accordance with various aspects and embodiments of the disclosed subject matter. The system 100 can comprise a mobile communication network (MOBILE COMM NW) 102 (e.g., mobile core network) that can provide wireless communication services, including voice calls and data communications, to communication devices associated with the mobile communication network 102, as more fully described herein. The mobile communication network 102 can be associated with (e.g., communicatively connected to) various data networks (e.g., packet data networks, such as the Internet or various portions of the Internet) that can be located in various locations throughout an area (e.g., a country, or portion thereof). For instance, the data networks (DNs) can include a first data network 104 that can be located in a first region (e.g., first geographical region) comprising or in proximity to a first location and a second data network 106 that can be located in a second region (e.g., second geographical region) comprising or in proximity to a second location. The first location and the second location can be distinct from each other and/or non-overlapping with respect to each other.

The mobile communication network 102 can comprise or be associated with (e.g., communicatively connected to) a communication management component (CMC) 108 that can manage connections of communication devices, including, for example, communication device (COMM DEV) 110, with anchor network components, serving network components, and other components or devices of or associated with the communication network, and routing of data traffic associated with the communication devices, in connection with use of applications by the communication devices while the communication devices are moving, in accordance with defined communication management criteria. In accordance with various embodiments, the CMC 108 can be part of an anchor network component (ANCHOR NW COMP) (e.g., anchor network component 112 or anchor network component 114), a serving network component (SER NW COMP) (e.g., serving network component 116 or serving network component 118), or another network component (NW COMP) (e.g., network component 120 or network component 122) of the mobile communication network 102, or can be a distinct component of the mobile communication network 102 and associated with (e.g., communicatively connected to) an anchor network component, a serving network component, or another network component of the mobile communication network 102. In accordance with various embodiments, the network component 120 and network component 122 each can be or can comprise a mobility management node function, such as a mobility management entity (MME) component (also referred to herein as MME) or an access and mobility management function (AMF) component (also referred to herein as AMF).

The system 100, employing the CMC 108 and other components of the system 100, can enable applications (e.g., local applications) and location-based content to be available to communication devices of users as the users and their communication devices move from location to location, even as users and their communication devices travel significant distances. The system 100, employing the CMC 108 and other components of the system 100, also can manage mobile data sessions to provide mobile data session continuity, if and when desired (e.g., if and when wanted or necessary), for communication device utilizing applications. The system 100, employing the CMC 108 and other components of the system 100, further can manage mobile data sessions to enhance (e.g., improve or optimize) connectivity to provide application continuity and local based content if and when they are desired (e.g., wanted or necessary, or are a priority), even if mobile data session continuity does not have to be maintained.

The CMC 108 can desirably manage mobile data sessions between communication devices and applications to enable applications and services, such as mobile edge computing applications and services, to follow communication devices and associated users as they move from location to location, even distant locations from their original location (e.g., original location where a mobile data session is established). The CMC 108 can track the location of a communication device and can switch (e.g., automatically, dynamically, and/or intelligently switch) application or service instances (e.g., edge computing application or service instances) and/or content instances to follow movement and location (e.g., current location) of the communication device, in accordance with defined communication management criteria, as more fully described herein. The CMC 108 can ensure that desirable (e.g., best, most desirable, improved, or suitable) application instances (e.g., application cloud instances) can be selected for the communication device and associated user given the proximity of the location of the communication device in the mobile communication network 102. The CMC 108, employing the techniques described herein, can enable users of communication devices to desirably receive superior experiences when using applications (e.g., ultra-low latency applications) and interactive content (e.g., highly interactive content), without there having to be any manual intervention or action by the users themselves.

At a given time, the communication device 110 can be associated with (e.g., communicatively connected to) a radio access network (RAN) 124 (e.g., connected to a base station of the RAN 124) of the mobile communication network 102, wherein the RAN 124 can facilitate providing wireless communication services to communication devices, such as communication device 110, when those communication devices are located in a coverage area covered or served by the RAN 124. For instance, at a given time, the communication device 110 can be located in a first location 126 that can be part of the coverage area covered or served by the RAN 124, and the communication device 110 can connect to the RAN 124 to be connected with the mobile communication network 102 and other networks (e.g., data networks) associated with the mobile communication network 102, as more fully described herein.

In some embodiments, when the communication device 110 is activated (e.g., turned to an on state, or otherwise activated), while located in the first location 126, the CMC 108 can determine the location (e.g., first location 126) of the communication device 110 based at least in part on the results of analyzing first location information associated with the communication device 110, wherein the first location information can indicate that the communication device 110 is in the first location 126. The first location information can comprise, for example, tracking area information, cell location information, registration area information, or geo-location information associated with the communication device 110 or one or more base stations in proximity to the communication device 110. The CMC 108 can receive location information, such as the first location information from network components (e.g., RAN 124, serving network component 116, anchor network component 112, or network component 120 (e.g., MME or AMF)) or the communication device 110.

The CMC 108 can determine a first anchor network component 112 (e.g., first PGW or first UPF) and/or first serving network component 116 (e.g., first SGW, or the first UPF, which can include serving gateway functionality) that are located in proximity to the first location 126 and can provide coverage (e.g., wireless coverage) for the first location 126 (e.g., coverage for a first region (e.g., coverage area of the RAN 124) comprising the first location 126). In some embodiments, the first anchor network component 112 can be a packet gateway component (also referred to herein as PGW), and the serving network component 116 can be a serving gateway component (also referred to herein as SGW), for example, when the mobile communication network 102, or portion thereof, comprises LTE network components. In other embodiments, the first anchor network component 112 can be a user plane function component (also referred to herein as a UPF) that can comprise a packet gateway sub-component that can function as a PGW and a serving gateway sub-component that can function as an SGW, for example, when the mobile communication network 102, or portion thereof, comprises 5G network components. The dotted line surrounding the anchor network component 112 and the serving network component 116 is intended to indicate instances where the anchor network component 112 is a UPF that comprises PGW functionality and SGW functionality (e.g., same or similar functionality of the serving network component 116, which can comprise serving gateway functionality). Similarly, the dotted line surrounding the anchor network component 114 and the serving network component 118 is intended to indicate instances where the anchor network component 114 is a UPF that comprises PGW functionality and SGW functionality.

At some desired time, the user of the communication device 110 can desire to utilize the communication device 110 to access and utilize an application (APP) 128. In some embodiments, the application 128 can be an ultra-low latency application that can desire ultra-low latency in data traffic flow in order to perform or function in a desirable (e.g., suitable, acceptable, or optimal) manner and/or the application 128 can involve interactive content. Certain types of applications, including, for example, many edge computing applications, can desire ultra-low latency in order to function as desired (e.g., function properly, acceptably, or suitably) and may be unable to adequately tolerate higher amounts of latency in data traffic flow. The CMC 108 can establish or facilitate establishing, via the first anchor network component 112 and/or the first serving network component 116, a data session (e.g., mobile data session) between the communication device 110 and a first application server 130 associated with the application 128. The first application server (APP SRV) 130 can be associated with (e.g., communicatively connected to) the first data network 104 (e.g., packet data network, such as the Internet) that can be associated with the first anchor network component 112. The first anchor network component 112 can assign or associate an Internet Protocol (IP) address and/or an application level identifier (ID) (e.g., a unique application level ID) to or with the communication device 110 with respect to the data session. Certain applications can employ and recognize application level IDs, and can determine and assign a unique application level ID to a communication device when a data session is being created between a communication device and the application (e.g., an application server associated with the application). Data traffic can be communicated between the first application server 130 and the communication device 110 via the first data network 104, the first anchor network component 112, and/or the first serving network component 116.

During the data session, the CMC 108 can monitor and track communication conditions associated with the communication device 110, including communication conditions associated with the data session between the communication device 110 and the first application server 130 as the communication device 110 accesses or uses the application 128. The communication conditions can comprise, for example, jitter, latency (e.g., delay), data packet loss, and/or throughput of the data traffic between the communication device 110 and an application server (e.g., first application server 130). For example, the CMC 108 can monitor and track the amount of jitter, the amount of latency, the amount of data packet loss, and/or the amount of throughput of the data traffic between the communication device 110 and the first application server 130. It is to be appreciated and understood that, additionally or alternatively, other communication conditions associated with the communication device can be tracked by the CMC 108 in connection with the CMC 108 managing connection of communication devices with anchor network components, serving network components, and other components or devices of or associated with a communication network, and routing of data traffic, in connection with the use of applications by communication devices including while communication devices are moving.

At some point in time, the user, with the communication device 110, can move from the first location 126 to a second location 132. The communication device 110 can connect to the RAN 134 of the mobile communication network 102, wherein the RAN can provide wireless services to a wireless coverage area that can comprise the second location 132.

The CMC 108 can be tracking movement of the communication device 110 based at least in part on location information associated with the communication device 110. The CMC 108 can receive second location information from network components (e.g., RAN 134, first serving network component 116, first anchor network component 112, second serving network component 118, second anchor network component 114, network component 120, or network component 122) or the communication device 110. In accordance with various embodiments, the network component 120 and network component 122 each can be or can comprise a mobility management node function, such as an MME or an AMF. The CMC 108 can analyze second location information associated with the communication device 110, wherein the second location information (e.g., tracking area information, cell location information, registration area information, or geo-location information associated with the communication device 110) can indicate the second location 132 of the communication device 110. Based at least in part on the results of analyzing the second location information, the CMC 108 can determine that the communication device 110 has moved and can determine the second location 132 of the communication device 110. In some instances, the second location 132 can be a significant distance away (e.g., 100 miles away, 200 miles away, 300 miles away, or some other significant distance greater than or less than 300 miles away) from the first location 126, such that communication conditions can be affected or impacted (e.g., negatively affected or impacted) due in part to the communication device 110 being connected to the first anchor network component 112 and/or first serving network component 116.

In that regard, the CMC 108 also can track communication conditions associated with the communication device 110. As the communication device 110 moves, communication conditions associated with the communication device 110 can change for a variety of reasons. For example, if the communication device 110 is initially located in Los Angeles, where the communication device 110 is connected to an anchor network component and a serving network component located at or near Los Angeles, and the communication device 110 is moved hundreds of miles away to Las Vegas, there can be a change (e.g., an undesirable change or degradation) in communication conditions, such as increased latency, reduced throughput, increased packet loss, and/or increased jitter, as the communication device 110 communicates with the application server associated with the anchor network component, in part, because the traffic flows between the communication device 110, in Las Vegas, and the application server, via the anchor network component and serving network component in Los Angeles, now have to travel hundreds of miles.

The CMC 108 can receive communication conditions information from the RAN 124, communication device 110, first anchor network component 112, and/or first serving network component 116. With regard to the communication device 110 being at the second location 132, the CMC 108 can analyze communication conditions information relating to the communication device 110 being at the second location 132. Based at least in part on the results of analyzing such communication conditions information, the CMC 108 can determine whether a communication condition(s) associated with the data session satisfies a defined threshold value(s) (e.g., amount, level, number, or percentage) relating to the communication condition(s).

The respective defined threshold values applicable to the respective communication conditions can indicate whether the respective communication conditions are acceptable or not acceptable, in accordance with the defined communication management criteria. For example, the defined threshold jitter value can be a defined maximum threshold amount of jitter that can be desired (e.g., acceptable) to maintain desirable communication of data traffic during the data session between the communication device 110 and the first application server 130. The CMC 108 can compare the amount of jitter for the data session to the defined maximum threshold amount of jitter to determine whether the amount of jitter satisfies (e.g., breaches; exceeds or is greater than) the defined maximum threshold amount of jitter.

The defined threshold latency value can be a defined maximum threshold amount of latency that can be desired (e.g., acceptable) to maintain desirable communication of data traffic during the data session. The CMC 108 can compare the amount of latency for the data session to the defined maximum threshold amount of latency to determine whether the amount of latency satisfies (e.g., breaches; exceeds or is greater than) the defined maximum threshold amount of latency.

The defined threshold data packet loss value can be a defined maximum threshold amount (e.g., number or percentage) of data packet loss that can be desired (e.g., acceptable) to maintain desirable communication of data traffic during the data session. The CMC 108 can compare the amount (e.g., number or percentage) of data packet loss for the data session to the defined maximum threshold amount of data packet loss to determine whether the amount of data packet loss satisfies (e.g., breaches; exceeds or is greater than) the defined maximum threshold amount of data packet loss.

The defined threshold throughput value can be a defined minimum threshold amount of throughput that can be desired (e.g., acceptable) to maintain desirable communication of data traffic during the data session. The CMC 108 can compare the amount of throughput for the data session to the defined minimum threshold amount of throughput to determine whether the amount of throughput satisfies (e.g., breaches; is less than) the defined minimum threshold amount of throughput.

If, based at least in part on the results of the analysis of the communication conditions information, the CMC 108 determines that none of the communication conditions associated with the data session breach the respective defined threshold values applicable to the respective communication conditions, the CMC 108 can determine that the traffic flow for the data session is acceptable and the data session associated with the communication device 110 can continue to use the first anchor network component 112 and first serving network component 116.

If, when the communication device 110 is at the second location 132, the CMC 108 determines that a communication condition(s) associated with the communication device 110 (e.g., associated with the data session of the communication device 110) satisfies (e.g., breached) a defined threshold value(s) (e.g., amount, level, number, or percentage) applicable with respect to the communication condition(s), based at least in part on the results of analyzing communication conditions information associated with the communication device 110, the CMC 108 can determine whether to change the serving network component 116 and/or anchor network component 112 for the communication device 110, in accordance with defined communication management criteria, to facilitate improving communication conditions associated with the communication device 110 and/or the data session. In that regard, the CMC 108 can determine whether mobile data session continuity in the mobile packet core is desirable (e.g., wanted, needed, or important), in addition to application session continuity. If the CMC 108 determines that such mobile data session continuity can be desired, in addition to application session continuity, the CMC 108 can perform serving gateway user plane relocation and local offload for applications and services (e.g., edge computing or ultra-low latency applications and services), as more fully described herein.

In some embodiments, the CMC 108 can determine whether an interruption of the data session for up to a defined period of time is permitted. For instance, the CMC 108 can analyze a set of characteristics, comprising one or more characteristics (e.g., attributes), associated with the application 128 and/or a set of preferences or specifications (e.g., service continuity preferences or specifications), comprising one or more preferences or specifications (e.g., attributes), associated with the communication device 110 (e.g., preferences or specifications associated with or user profile or a UE subscription associated with the communication device 110), wherein one or more of the characteristics and/or the one or more preferences or specifications can indicate whether an interruption of the data session for up to a defined period of time (e.g., 100 milliseconds or less) is permitted (e.g., allowed or acceptable). The set of characteristics can comprise or relate to, for example, specifications (e.g., requirements) of the application 128 that are to be satisfied to achieve desirable (e.g., acceptable, suitable, or optimal) use of the application 128. If, based at least in part on the results of analyzing the set of characteristics associated with the application 128 and/or the set of preferences or specifications associated with the communication device 110, the CMC 108 determines that such an interruption of the data session is not permitted, the CMC 108 can determine whether there is a second (e.g., local) serving network component (e.g., serving network component 118) in proximity to the second location 132 that can serve the communication device 110 with regard to the data session with the application 128. In this regard, the CMC 108 also can determine whether there is a second data network (e.g., data network 106) and second application server (e.g., application server 136) associated with the application 128 in proximity (e.g., relative proximity) to the second location 132, wherein the second data network 106 can be associated with the second serving network component 118 and the second application server 136. For instance, the CMC 108 can determine whether there is a second serving network component, second data network, and/or second application server that are within a defined distance of the second location 132 or RAN 134, or are in closer proximity to the second location 132 or RAN 134 than the first serving network component 116, first data network 104, and/or first application server 130, respectively.

In response to determining that there is a second serving network component 118 in proximity to the second location 132 that can serve the communication device 110 with regard to the data session with the application 128 as well as an associated second data network 106 and a second application server 136 associated with the application 128, the CMC 108 can switch or facilitate switching the communication device 110 from being connected to and/or served by the first serving network component 116 to being connected to and/or served by the second serving network component 118 (e.g., second SGW, or second UPF comprising a serving gateway (e.g., second serving network component 118)). In connection with the switching from the first serving network component 116 to the second serving network component 118, the CMC 108 also can configure or facilitate configuring local destination IP offload criteria. In some embodiments, if and when desired (e.g., if and when appropriate, wanted, or needed), the CMC 108 can communicate a message or signal to the control plane function to indicate or signal that changes to the application instances (e.g., application cloud instances) are to be made, and/or the CMC 108 or control plane function can communicate with the second data network 106 and/or second application server 136 to facilitate the changes to the application instances. The CMC 108, for instance, can communicate with and inform the application instance (e.g. the second application server 136) that local resource allocations are desired for the communication device 110. The CMC 108 also can determine service continuity preferences or specifications from a UE subscription or user profile associated with the communication device 110. In certain embodiments, the CMC 108, control plane function, or other component of the mobile communication network 102 (e.g., as managed by the CMC 108) can initiate the switch from the first serving network component 116 to the second serving network component 118, the switch from the first data network 104 to the second data network 106, and/or the switch from the first application server 130 to the second application server 136 after (e.g., only after) application resource allocation (e.g., application cloud resource allocation) by the second application server 136 and application 128 has been confirmed. The communication device 110 can continue to be associated with the first anchor network component 112 (e.g., first PGW, or first UPF) with respect to the data session, and the first anchor network component 112 can continue to be the data session anchor (e.g., mobile data session anchor), however, data traffic for the data session does not have to be routed through the first anchor network component 112. In certain embodiments, the second serving network component 118 can be enhanced to be able to comprise at least some packet data gateway functions that can enable the second serving network component 118 to access and communicate with the second data network 106 to communicate data traffic between the communication device 110 and second application server 136, without such data traffic having to be routed through the first anchor network component 112. For instance, the second serving network component 118 can provide a local data traffic offload without the data traffic flow of the data session reaching the first anchor network component 112. By user the second serving network component 118 (e.g., local SGW) for local traffic offload without the data traffic flow reaching or being routed through the first anchor network component 112 (e.g., first PGW), the user of the communication device 110 can desirably interact (e.g., always or substantially always interact) with local contents associated with the application and also may not have to interrupt the current logical connection of the mobile data session to the first anchor network component 112.

The CMC 108 can facilitate (e.g., enable) the communication device 110 to synchronize information relating to the data session with the second serving network component 118, second data network 106, and/or second application server 136 to facilitate desirable continuation of the data session. The same Internet protocol (IP) address and/or same application level ID (e.g., unique application level ID assigned to the communication device 110 by the application 128) associated with the communication device 110 with respect to the data session can continue to be used for the data session after switching to have the communication device 110 served by the second serving network component 118.

In some embodiments, when UPFs are employed in the mobile communication network 102, the second UPF (e.g., second UPF comprising a serving gateway (e.g., second serving network component 118) as well as a second packet data network gateway) can be inserted into the communication path associated with the communication device 110, and the first UPF (e.g., first UPF comprising a first packet data network gateway (e.g., first anchor network component 112) as well as a first serving gateway) can remain in the communication path at least to continue to act as a mobility anchor for the data session, as more fully described herein.

In certain embodiments, the CMC 108 can communicate with applications (e.g., application 128) or associated application servers (e.g., second application server 136) that are relatively close to a location (e.g., second location 132) a communication device (e.g., communication device 110) is located at or is expected to be in the near term to enable the application (e.g., edge computing application) or associated application server to prepare resource allocation in order to anticipate the movement or potential movement of the communication device and associated user. For example, when the communication device 110 has been determined (e.g., by CMC 108) to reach the second location 132, or while the communication device 110 is determined (e.g., by CMC 108) to be moving toward the second location 132, but prior to the communication device 110 reaching the second location 132, the CMC 108 can communicate with the second application server 136 or the application 128 to notify the second application server 136 or application 128 that the communication device 110 is in the second location 132 or is predicted to be moving toward the second location 132 to facilitate preparing resource allocation (e.g., dynamically preparing resource allocation) of an application resource(s) (e.g., processing resources, memory resources, time resources, . . . ) of the application 128 by the second application server 136 or application 128. In response, the application 128 or second application server 136 can allocate (e.g., automatically or dynamically allocate) application resources for the communication device 110. In some embodiments, a communication interface that can enable such communication between the CMC 108 and the application 128 or second application server 136 can be coordinated with third-party application providers who can desire to provide their customers desirable (e.g., best, suitable, or optimal) application experiences.

In accordance with various embodiments, alternatively or additionally, if the CMC 108 determines that an interruption of the data session for up to the defined period of time (e.g., 100 milliseconds or less) is permitted, and if the CMC 108 determines that there is a second anchor network component (e.g., anchor network component 114) in relative proximity to the second location 132 (e.g., as compared to the first anchor network component 112) and/or an associated second data network (e.g., data network 106) and second application server (e.g., application server 136) associated with the application 128, the CMC 108 can determine that the communication device 110 can be switched from the first anchor network component 112 to the second anchor network component 114. For instance, if the CMC 108 determines that mobile data session continuity in the mobile core does not have to be maintained (e.g., if the CMC 108 determines that interruption of the data session for up to the defined time is permitted), the CMC 108 can detect or determine the location of the communication device 110, and can determine (e.g., intelligently determine) a desirable (e.g., best or suitable) local gateway location and desirable (e.g., best or suitable) local content (e.g., application content) for the communication device 110 based at least in part on the location of the communication device 110. In response to determining the communication device 110 is to be switched from the first anchor network component 112 to the second anchor network component 114, the CMC 108 can communicate a request message to the communication device 110, wherein the request message can request that the communication device 110 deactivate, to facilitate terminating a first connection with the first anchor network component 112 and terminate the data session, and reactivate to initiate and/or establish connection of the communication device 110 with the second anchor network component 114 to initiate and/or establish a second data session between the communication device 110 and the second application server 136 associated with the application 128. In response to the request message, the communication device 110 can deactivate to facilitate terminating the first connection with the first anchor network component 112 and terminating the data session, and can reactivate to initiate and/or establish a second connection with the second anchor network component 114, and can initiate and/or establish the second data session between the communication device 110 and the second application server 136, via the second anchor network component 114 and second data network 106. In connection with connecting to the second anchor network component 114, the communication device 110 also can be connected to the second serving network component 118.

The CMC 108 can facilitate synchronization of information relating to the terminated data session between the communication device 110 and the second anchor network component 114, second serving network component 118, second data network 106, and/or second application server 136 to facilitate desirable initiation of the second data session and use of the application 128 by the communication device 110. The CMC 108 can communicate or facilitate communicating the new IP address (e.g., second IP address) associated with the communication device 110 to the second data network 106 and/or second application server 136 to facilitate informing the second application server 136 of the new IP address. Data traffic associated with the second data session can be communicated between the communication device 110 and the second application server 136 via the second anchor network component 114, second serving network component 118, and second data network 106. The second anchor network component 114 can have a relatively shorter path and relatively lower latency with regard to communication of content (e.g., local application content) than the first anchor network component 112 had or would have had, which can thereby improve communication of data traffic for the communication device 110 while the communication device 110 uses the application 128 at or near the second location 132.

When mobile data session continuity does not have to be maintained (e.g., when interruption in the data session is permitted), there can be instances where the user of the communication device 110 can desire to control the data path switch (e.g., anchor network component switch) associated with the communication device 110. In some embodiments, the CMC 108 can enable the user to control the data path switch. The CMC 108 can inform the user about the current desirable (e.g., enhanced or optimal) service configurations (e.g., edge computing service configurations) associated with the data session or the application 128, and the user can decide whether and/or when to deactivate the communication device 110 and terminate the mobile data session, and reactivate the communication device 110 to initiate a switch to the second anchor network component 114 (and associated second serving network component 118), second data network 106, and/or second application server 136 to enable the communication device 110 to connect to the desired local content instances. If the user decides to deactivate and reactivate the communication device 110, in response to such instructions regarding that decision from the communication device 110 and associated user, the CMC 108 can coordinate with the communication device 110 to perform or facilitate performing such deactivation and reactivation of the communication device 110 and the transition to the second anchor network component 114 (and associated second serving network component 118), second data network 106, and/or second application server 136, as more fully described herein. The CMC 108 also can communicate or facilitate communicating the new IP address (e.g., second IP address) associated with the communication device 110 to the second data network 106 and/or second application server 136 to facilitate informing the second application server 136 of the new IP address.

If the communication device 110 moves from the second location 132 to a third location (or a fourth location, and so on), the CMC 108 can perform same or similar operations, such as more fully described herein, to determine whether a communication condition has been breached, whether a switch is to be made to a third serving network component (e.g., third SGW or third UPF), third anchor network component (e.g., third PGW or third UPF), third data network, and/or third application server associated with the application 128, in accordance with the defined communication management criteria. For instance, if the first location 126 was Los Angeles, Calif. and the second location 132 was Las Vegas, Nev., if the communication device 110 is moved to a third location of San Antonio, Tex., the CMC 108 can continue to track and measure communication conditions associated with the communication device 110 (as well as the location of the device 110), and can determine whether a communication condition has been breached (e.g., while the communication device 110 is at the third location), whether a switch is to be made to a third serving network component, third anchor network component, third data network, and/or third application server associated with the application 128, in accordance with the defined communication management criteria, as more fully described herein.

The disclosed subject matter, by employing the CMC 108, enhanced serving gateways (e.g., enhanced serving network component, such as an enhanced SGW), and the defined communication management criteria, can enhance efficiency of the communication network, including the mobile communication network 102, mitigate (e.g., reduce or minimize) jitter, latency, and/or data packet loss associated with communication of data traffic associated with communication devices, improve throughput associated with communication of data traffic associated with communication devices. The disclosed subject matter, by employing the CMC 108, enhanced serving gateways, and the defined communication management criteria, can reduce unnecessary communication or routing of data traffic over long distances through the mobile communication network 102 when a communication device moves from one location across a long distance to another location during a data session. Further, the disclosed subject matter, by employing the CMC 108, enhanced serving gateways, and the defined communication management criteria, can improve the user experience of a user using a communication device to use applications and communicate in a communication network, including improving quality of experience (QoE) for communication device users and quality of service (QoS) in the communication of data traffic. The disclosed subject matter can address and manage diverse service or application specifications (e.g., diverse edge computing service requirements), such as, for example, from mobile data session continuity to desirable (e.g., optimal, enhanced, or suitable) mobile data session placements, wherein in all such cases, application continuity can be desirably maintained (e.g., preserved) with the enhancements on the mobility management node functions, SGW functions, PGW functions, user plane functions, and session management (e.g., 5G or other next generation session management), such as more fully described herein.

With further regard to the communication network, including the mobile communication network 102, each RAN (e.g., RAN 124, RAN 134) can comprise or be associated with a set of base stations (e.g., access points (APs)) (not shown) that can serve communication devices (e.g., communication device 110) located in respective coverage areas served by respective base stations in the mobile communication network 102. A RAN (e.g., RAN 124, RAN 134) can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN employing another type of communication technology. In some embodiments, the RAN 124 and/or RAN 134 can be a cloud-RAN (C-RAN) that can be located in or associated with a cloud computing environment, comprising various cloud network components of the mobile communication network 102.

The respective base stations can be associated with one or more sectors (not shown), wherein respective sectors can comprise respective cells. The cells can have respective coverage areas that can form the coverage area covered by the one or more sectors. The respective communication devices (e.g., communication device 110) can be communicatively connected to the mobile communication network 102 via respective wireless or wireline communication connections with one or more of the respective cells.

Each RAN (e.g., RAN 124, RAN 134) can be part of the mobile communication network 102 (e.g., mobile core network), which can facilitate communications by communication devices (e.g., communication device 110) wirelessly connected to the mobile communication network 102, wherein respective communication devices can be communicatively connected to the mobile communication network 102 via respective base stations. The mobile communication network 102 can facilitate wireless communication of voice and data associated with devices associated with the mobile communication network 102. The mobile communication network 102 can facilitate routing voice and data communications between communication devices and/or other communication devices associated with an IP-based network (e.g., data network (e.g., data network 104, data network 106), such as the Internet, an intranet, . . . ) of or associated with the mobile communication network 102.

In accordance with various embodiments, the communication network can comprise a macro communication network and/or a micro communication network. The macro communication network can be, can comprise, or can be associated with the mobile communication network 102 (e.g., a cellular network and/or other type of mobile communication network), an IP-based network (e.g., data network 104, data network 106), Wi-Fi, gigabit wireless (Gi-Fi) network, Hi-Fi network (e.g., providing higher gigabit data communication than Gi-Fi or Wi-Fi), Bluetooth, ZigBee, etc. The micro communication network can be associated with the macro communication network, wherein the micro communication network typically can operate in a defined local area (e.g., in or in proximity to a home, building, or other defined area). The micro communication network can be, can comprise, or can be associated with Wi-Fi, Gi-Fi, Hi-Fi, Bluetooth, ZigBee, etc., and/or can be associated with (e.g., connected to) the macro communication network. The micro communication network can be or can comprise, for example a local area network (LAN), that can facilitate connecting certain devices (e.g., communication devices) associated with the micro communication network to each other and/or to the macro communication network.

The communication network can comprise one or more wireline communication networks and one or more wireless communication networks (e.g., mobile communication network 102), wherein the one or more wireless communication networks can be based at least in part on one or more various types of communication technology or protocols, such as, for example, 3G, 4G, 5G, or x generation (xG) network, where x can be virtually any desired integer or real value; Wi-Fi; Gi-Fi; Hi-Fi; etc. The communication network (e.g., core network, cellular network, or a network comprising a core network, cellular network, and/or an IP-based network) can facilitate routing voice and data communications between a communication devices (e.g., communication device 110) and another communication device associated with the communication network in the communication network environment. The communication network and/or the mobile communication network 102 also can allocate resources to the communication devices associated with the communication network and/or the mobile communication network 102, convert or enforce protocols, establish and enforce QoS for the communication devices, provide applications or services in the communication network and/or the mobile communication network 102, translate signals, and/ or perform other desired functions to facilitate system interoperability and communication in the communication network and/or the mobile communication network 102. The communication network 1002 and/or the mobile communication network 102 further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices in the communication network environment.

As a communication device (e.g., communication device 110) is moved through a wireless communication network environment, at various times, the communication device can be connected (e.g., wirelessly connected) to one of a plurality of base stations or APs (e.g., macro or cellular AP, femto AP, pico AP, wi-fi AP, wi-max AP, hotspot (e.g., hotspot 1.x, hotspot 2.x, where x is an integer number; a device (e.g., a device functioning as a mobile hotspot)) that can operate in the wireless communication network environment. An AP (e.g., base station) can serve a specified coverage area to facilitate communication by the communication device or other devices in the wireless communication network environment. An AP can serve a respective coverage cell (e.g., macrocell, femtocell, picocell, . . . ) that can cover a respective specified area, and the AP can service mobile wireless devices, such as a communication device located in the respective area covered by the respective cell, where such coverage can be achieved via a wireless link (e.g., uplink (UL), downlink (DL)). When an attachment attempt is successful, the communication device can be served by the AP and incoming voice and data traffic can be paged and routed to the device(s) through the AP, and outgoing voice and data traffic from the device(s) can be paged and routed through the AP to other communication devices in the communication network environment. In an aspect, the communication device can be connected and can communicate wirelessly using virtually any desired wireless technology, including, for example, cellular, Wi-Fi, Gi-Fi, Hi-Fi, Wi-Max, Bluetooth, wireless local area networks (WLAN), etc.

Figure 2:
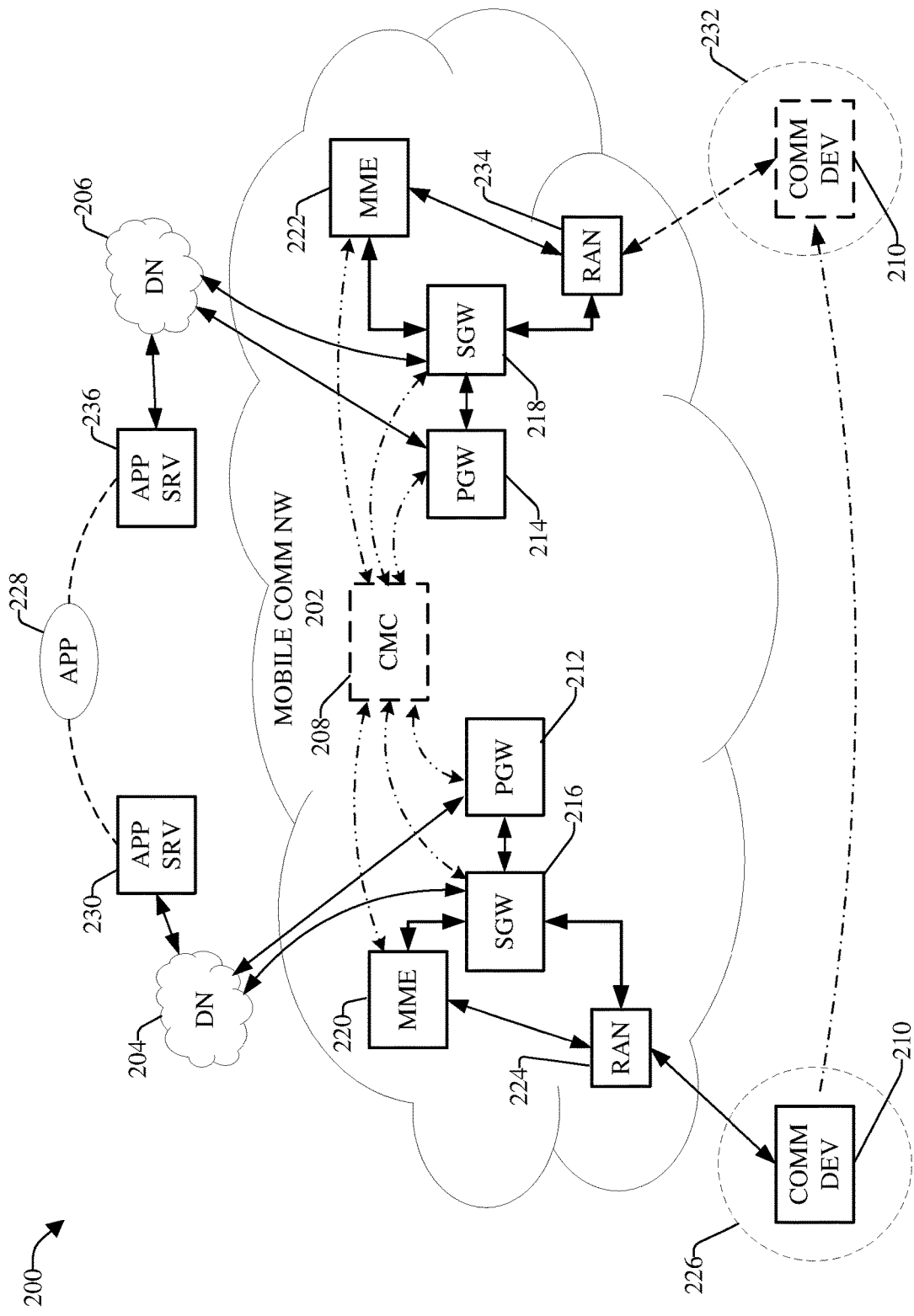
FIG. 2 depicts a block diagram of example system that can manage connection of communication devices with packet data network gateways (PGWs), serving gateways (SGWs), and other components or devices of or associated with a communication network, and routing of data traffic, in connection with use of applications by communication devices including while communication devices are moving, in accordance with various aspects and embodiments of the disclosed subject matter.

Referring to FIG. 2, FIG. 2 depicts a block diagram of example system 200 that can manage connection of communication devices with PGWs, SGWs, and other components or devices of or associated with a communication network, and routing of data traffic, in connection with use of applications by communication devices including while communication devices are moving, in accordance with various aspects and embodiments of the disclosed subject matter. The system 200 can comprise a mobile communication network 202 that can provide wireless communication services, including voice calls and data communications, to communication devices associated with the mobile communication network 202, as more fully described herein. In some embodiments, the mobile communication network 202 can comprise LTE-type network components and devices (e.g., SGWs, PGWs, MMEs, . . . ), as more fully described herein.

The mobile communication network 202 can be associated with (e.g., communicatively connected to) various data networks (e.g., packet data networks) that can be located in various locations throughout an area (e.g., a country, or portion thereof). For instance, the data networks can include a first data network 204 that can be located in a first region (e.g., first geographical region) comprising or in proximity to a first location and a second data network 206 that can be located in a second region (e.g., second geographical region) comprising or in proximity to a second location. The first location and the second location can be distinct from each other and/or non-overlapping with respect to each other.

The mobile communication network 202 can comprise or be associated with (e.g., communicatively connected to) a CMC 208 that can manage connections of communication devices, including, for example, communication device 210, with PGWs, SGWs, and other components or devices of or associated with the mobile communication network 202, and routing of data traffic associated with the communication devices, in connection with use of applications by the communication devices while the communication devices are moving, in accordance with the defined communication management criteria. In accordance with various embodiments, the CMC 208 can be part of a PGW (e.g., PGW 212 or PGW 214), an SGW (e.g., SGW 216 or SGW 218), or another network component (e.g., MME 220 or MME 222) of the mobile communication network 202, or can be a distinct component of the mobile communication network 202 and associated with (e.g., communicatively connected to) a PGW, SGW, or other network component of the mobile communication network 202.

The mobile communication network 202 can comprise RAN 224 that can facilitate providing wireless communication services to communication devices (e.g., communication device 210) when those communication devices are located in a coverage area covered or served by the RAN 224. At a given time when the communication device 210 is in proximity to the RAN 224 and is activated (e.g., in the on state or otherwise activated), the communication device 210 can be associated with (e.g., communicatively connected to) the RAN 224. For instance, at a given time, the communication device 210 can be located in a first location 226 that can be part of the coverage area covered or served by the RAN 224, and the communication device 210 can connect to the RAN 224 to be connected with the mobile communication network 202 and other networks (e.g., data networks) associated with the mobile communication network 202.

In response to the communication device 210 being activated (e.g., turned on or otherwise activated) while located in the first location 226, the communication device 210 can be connected to the RAN 224, and/or the CMC 208 can determine the first location 226 of the communication device 210 based at least in part on the first location information (e.g., tracking area information, cell location information, registration area information, or geo-location information) associated with the communication device 210, wherein the first location information can indicate the first location 226 of the communication device 210.

The CMC 208 can determine a first PGW 212 and a first SGW 216 that are located in proximity to the first location 226 of the communication device 210. The first PGW 212 can serve as an anchor point (e.g., mobility anchor for a data session) for communication devices, such as the communication device 210, located in a region, comprising the first location 226, covered by the first PGW 212. The first PGW 212 can be associated with the first data network 204 (e.g., first packet data network), wherein one or more applications, such as application 228, can be associated with and accessed (e.g., by communication devices) via the first data network 204. The first SGW 216 can be associated with the first PGW 212 and can serve as a serving gateway for communication devices, such as the communication device 210, located in a first portion of the region, comprising the first location 226.

The CMC 208 can establish or facilitate establishing, via the first PGW 212 and first SGW 216, a data session (e.g., mobile data session) between the communication device 210 and the first application server 230 associated with the application 228. The first application server 230 can be associated with (e.g., communicatively connected to) the first data network 204. The communication device 210 and the first application server 230 can communicate data traffic to each other while the communication device 210 is located at the first location 226 or as the communication device 210 moves from the first location to other locations.

The CMC 208, and/or other components (e.g., SGW(s), PGW(s), MME(s), or RAN(s), . . . ) of the mobile communication network 202, can monitor and track movement of the communication device 210 based at least in part on location information associated with the communication device 210. For instance, if the communication device 210 moves from the first location 226 to a second location 232, the CMC 208 can receive second location information from network components (e.g., RAN 234, first SGW 216, first PGW 212, second SGW 218, second PGW 214, MME 220, or MME 222) or the communication device 210. The CMC 208 can analyze second location information associated with the communication device 210, wherein the second location information (e.g., tracking area information, cell location information, registration area information, or geo-location information associated with the communication device 210) can indicate or identify the second location 232 of the communication device 210. Based at least in part on the results of analyzing the second location information, the CMC 208 can determine that the communication device 210 has moved and can determine the second location 232 of the communication device 210. In some instances, the second location 232 can be a significant distance away (e.g., 100 miles away, 200 miles away, 300 miles away, or some other significant distance greater than or less than 300 miles away) from the first location 226, such that communication conditions can be affected or impacted (e.g., negatively affected or impacted) due in part to the communication device 210 being connected to the first SGW 216 and/or first PGW 212.

In some embodiments, the CMC 208, and/or other components of the mobile communication network 202, also can monitor and track communication conditions associated with the data session between the communication device 210 and the first application server 230 as the communication device 210 accesses or uses the application 228. The communication conditions can comprise, for example, jitter, latency, data packet loss, and/or throughput associated with the communication of the data traffic between the communication device 210 and the first application server 230. For example, the CMC 208 can determine and track the amount of jitter, the amount of latency, the amount of data packet loss, and/or the amount of throughput of the data traffic between the communication device 210 and the first application server 230.

While the communication device 210 is at the second location 232, the CMC 208 can receive communication conditions information relating to the communication conditions associated with the data session from network components or devices (e.g., RAN 234, first SGW 216, first PGW 212, second SGW 218, second PGW 214, MME 220, or MME 222) of the mobile communication network 202 or the communication device 210. The CMC 208 can analyze the communication conditions information relating to the communication conditions. Based at least in part on the results of analyzing the communication conditions information, the CMC 208 can determine the communication conditions (e.g., jitter, latency, data packet loss, or throughput) associated with the data session between the communication device 210 and the first application server 230. The CMC 208 can analyze (e.g., compare) the respective values (e.g., amounts, levels, numbers, or percentages) of the respective communication conditions in relation to the respective defined threshold values applicable to the respective communication conditions. The respective defined threshold values can comprise, for example, a defined threshold amount of jitter (e.g., defined maximum threshold amount of jitter), defined threshold amount of latency (e.g., defined maximum threshold amount of latency), defined threshold amount (e.g., number or percentage) of data packet loss (e.g., defined maximum threshold amount of data packet loss), and/or defined threshold amount of throughput (e.g., defined minimum threshold amount of throughput) associated with the communication device 210, wherein the defined management criteria can specify or indicate the respective defined threshold values applicable to the respective communication conditions.

If the CMC 208 determines that none of the communication conditions associated with the data session breach the respective defined threshold values applicable to the respective communication conditions, the CMC 208 can determine that the traffic flow for the data session is acceptable, in accordance with the defined communication management criteria, and can determine that the data session can continue to use the first PGW 212 and first SGW 216 (e.g., while the communication device 210 is located at the second location 232).

If, however, based at least in part on the results of analyzing the communication conditions information, the CMC 208 determines that one or more communication conditions (e.g., jitter, latency, data packet loss, and/or throughput) associated with the data session does satisfy (e.g., does breach) the defined threshold value(s) applicable to that communication condition(s), the CMC 208 can determine whether to change the SGW 216 and/or PGW 212 for the communication device 210 and/or data session, in accordance with defined communication management criteria, to facilitate improving communication conditions associated with the communication device 210 and/or the data session.

In certain embodiments, the CMC 208 can determine whether an interruption of the data session for the communication device 210 for up to a defined period of time is permitted, in accordance with the defined communication management criteria and/or a set of characteristics associated with the application 228 and/or a set of preferences or specifications associated with the communication device 210. For instance, the CMC 208 can analyze the set of characteristics associated with the application 228 and/or the set of preferences or specifications associated with the communication device 210, wherein one or more of the characteristics and/or one or more preferences or specifications can indicate whether an interruption of the data session for up to a defined period of time (e.g., 100 milliseconds or less) is permitted. If, based at least in part on the results of analyzing the set of characteristics associated with the application 228 and/or set of preferences or specifications associated with the communication device 210, the CMC 208 determines that such an interruption of the data session is not permitted, the CMC 208 can determine whether there is a second (e.g., local) SGW (e.g., SGW 218) in relative proximity to the second location 232 that can serve the communication device 210 with regard to the data session with the application 228. In this regard, the CMC 208 also can determine whether there is a second data network (e.g., data network 206) and second application server (e.g., application server 236) associated with the application 228 in relative proximity to the second location 232, wherein the second data network 206 can be associated with the second SGW 218 and the second application server 236. For example, the CMC 208 can determine whether there is a second SGW, second data network, and/or second application server that are within a defined distance of the second location 232 or RAN 234, or are in closer proximity to the second location 232 or RAN 234 than the first SGW 216, first data network 204, and/or first application server 230, respectively.

If the CMC 208 determines that such interruption of the data session for up to the defined amount of time is not permitted, the CMC 208 can determine whether there is another SGW (e.g., SGW 218) in proximity to the second location 232 that can provide improved communication conditions for the data session, as compared to the first SGW 216 and first PGW 212. If the CMC 208 determines that there is not another SGW in proximity to the second location 232 that can provide improved communication conditions for the data session, the CMC 208 can determine that the data session can continue to use the first PGW 212 and first SGW 216.

If, however, the CMC 208 determines that there is another SGW (e.g., second SGW 218) in proximity to the second location 232 that can provide improved communication conditions for the data session (e.g., as compared to the first SGW 216 and first PGW 212), the CMC can determine that the data session is to be switched from the first SGW 216 to have the communication device 210 and data session served by the second SGW 218. The CMC 208 also can configure or facilitate configuring local destination IP offload criteria in connection with the transition to the second SGW 218. The CMC 208 can switch (e.g., transition or redirect) or facilitate switching the communication device 210 and the data session from the first SGW 216 to the second SGW 218, and can facilitate connecting the second SGW 218 to the communication device 210, wherein the second SGW 218 can serve the communication device 210 from that point in the data session, instead of the first SGW 216. The communication device 210 can remain connected to the first PGW 212 associated with the first location 226, wherein the PGW 212 can continue to be the mobility anchor for the communication device 210 and data session. However, data traffic for the data session does not have to be routed through the first PGW 212. In some embodiments, the second SGW 218 can be enhanced to be able to comprise at least some packet data gateway functions that can enable the second SGW 218 to access and communicate with the second data network 206 to communicate data traffic between the communication device 210 and second application server 236, without such data traffic having to be routed through the first PGW 212. For instance, the second SGW 218 can provide a local data traffic offload without the data traffic flow of the data session reaching, or being communicated via, the first PGW 212.

The CMC 208 also can facilitate synchronization of information relating to the data session between the communication device 210, the second SGW 218, second data network 206, and/or second application server 236 to facilitate desirable continuation of the data session. The same IP address and/or same application level ID (e.g., unique application level ID) associated with the communication device 210 with respect to the data session can continue to be used for the data session after switching to have the communication device 210 served by the second SGW 218.

In certain embodiments, alternatively or additionally, if the CMC 208 determines that an interruption of the data session for up to the defined period of time is permitted, in accordance with the set of characteristics associated with the application 228, the set of preferences or specifications associated with the communication device 210, and/or the defined communication management criteria, the CMC 208 can determine whether there is another PGW (e.g., second PGW 214) in relative proximity to the second location 232 (e.g., as compared to the first PGW 212), as well as an associated data network (e.g., second data network 206) and/or another application server (e.g., second application server 236) associated with the application 228 in relative proximity to the second location 232. If the CMC 208 determines that there is another PGW (e.g., second PGW 214) in relative proximity to the second location 232, and another data network (e.g., second data network 206) and/or application server (e.g., second application server 236) associated with the application 228 in relative proximity to the second location 232, the CMC 208 can determine that the communication device 210 can be switched from the first PGW 212 to the second PGW 214. The CMC 208 can communicate a request message to the communication device 210 to request that the communication device 210 deactivate (e.g., switch to an inactive or deactivated state), to facilitate terminating a first connection with the first PGW 212 and terminate the data session, and reactivate to initiate and/or establish connection of the communication device 210 with the second PGW 214 to initiate and/or establish a second data session between the communication device 210 and the second application server 236 associated with the application 228. In response to the request message, the communication device 210 can deactivate to facilitate terminating the first connection with the first PGW 212 and terminating the data session, and can reactivate to initiate and/or establish a second connection with the second PGW 214, and can initiate and/or establish the second data session between the communication device 210 and the second application server 236, via the second PGW 214 and second data network 206. In connection with connecting to the second PGW 214, the communication device 210 also can be connected to the second SGW 218.

The CMC 208 also can facilitate synchronizing information relating to the terminated data session between the communication device 210 and the second PGW 214, second SGW 218, second data network 206, and/or second application server 236 to facilitate desirable initiation of the second data session and use of the application 228 by the communication device 210. The CMC 208 can communicate or facilitate communicating the new IP address (e.g., second IP address) associated with the communication device 210 to the second data network 206 and/or second application server 236 to facilitate informing the second application server 236 of the new IP address. Data traffic associated with the second data session can be communicated between the communication device 210 and the second application server 236 via the second PGW 214, second SGW 218, and second data network 206.

When mobile data session continuity does not have to be maintained (e.g., when interruption in the data session is permitted), there can be instances where the user of the communication device 210 can desire to control the data path switch (e.g., PGW switch to the second PGW 214) associated with the communication device 210. In some embodiments, the CMC 208 can enable the user to control such data path switch, in accordance with the defined communication management criteria, as more fully described herein.

Figure 3:
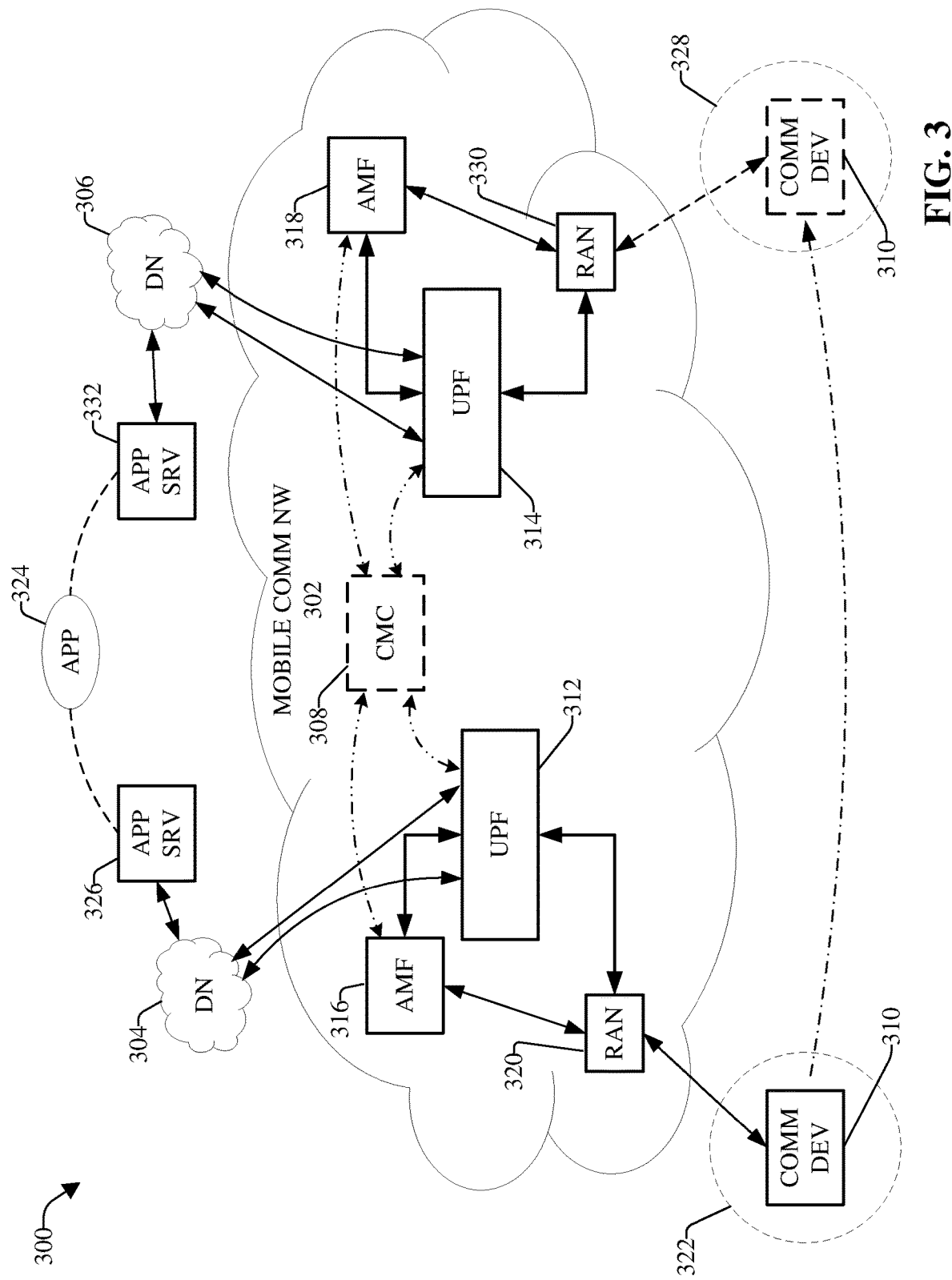
FIG. 3 presents a diagram of an example system that can manage connection of communication devices with user plane functions (UPFs) and other components or devices of or associated with a communication network, and routing of data traffic, in connection with use of applications by communication devices including while communication devices are moving, in accordance with various aspects and embodiments of the disclosed subject matter.

Turning to FIG. 3, FIG. 3 presents a diagram of an example system 300 that can manage connection of communication devices with UPFs and other components or devices of or associated with a communication network, and routing of data traffic, in connection with use of applications by communication devices including while communication devices are moving, in accordance with various aspects and embodiments of the disclosed subject matter. The system 300 can comprise a mobile communication network 302 that can provide wireless communication services, including voice calls and data communications, to communication devices associated with the mobile communication network 302, as more fully described herein. In some embodiments, the mobile communication network 302 can comprise 5G (or other next generation) network components and devices (e.g., UPFs, AMFs, . . . ), as more fully described herein.

The mobile communication network 302 can be associated with various data networks that can be located in various locations throughout an area (e.g., a country, or portion thereof). For instance, the data networks can include a first data network 304 that can be located in a first region comprising or in proximity to a first location and a second data network 306 that can be located in a second region comprising or in proximity to a second location. The first location and the second location can be distinct from each other and/or non-overlapping with respect to each other.

The mobile communication network 302 can comprise or be associated with (e.g., communicatively connected to) a CMC 308 that can manage connections of communication devices, including, for example, communication device 310, with UPFs and other components or devices of or associated with the mobile communication network 302, and routing of data traffic associated with the communication devices, in connection with use of applications by the communication devices while the communication devices are moving, in accordance with the defined communication management criteria. In accordance with various embodiments, the CMC 308 can be part of a UPF (e.g., UPF 312 or UPF 314) or another network component (e.g., AMF 316 or AMF 318) of the mobile communication network 302 or can be a distinct component of the mobile communication network 302 and associated with (e.g., communicatively connected to) a UPF or other network component of the mobile communication network 302.

The mobile communication network 302 can comprise RAN 320 that can facilitate providing wireless communication services to communication devices (e.g., communication device 310) when those communication devices are located in a coverage area covered or served by the RAN 320. At a given time when the communication device 310 is in proximity to the RAN 320 and is activated (e.g., in the on state or otherwise activated), the communication device 310 can be associated with (e.g., communicatively connected to) the RAN 320. For instance, at a given time, the communication device 310 can be located in a first location 322 that can be part of the coverage area covered or served by the RAN 320, and the communication device 310 can connect to the RAN 320 to be connected with the mobile communication network 302 and other networks (e.g., data networks) associated with the mobile communication network 302.

In response to the communication device 310 being activated (e.g., turned on or otherwise activated) while at the first location 322, the CMC 308 can determine the first location 322 of the communication device based at least in part on the first location information associated with the communication device 310, as more fully described herein. The CMC 308 can determine a first UPF (e.g., UPF 312) that can be located in relative proximity to the first location 322 of the communication device 310, as compared to the locations of other UPFs (e.g., UPF 314) in relation to the communication device 310. The first UPF 312 can serve as a mobility anchor point (e.g., an anchor network component) and also as a serving gateway (e.g., serving network component) for communication devices, such as the communication device 310, located in a region, comprising the first location 322, covered by the first UPF 312. The first UPF 312 can be associated with the first data network 304 (e.g., first packet data network), wherein one or more applications, such as application 324, can be associated with and accessed (e.g., by communication devices) via the first data network 304.

The CMC 308 can establish or facilitate establishing, via the first UPF 312, a data session (e.g., mobile data session) between the communication device 310 and a first application server 326 associated with the application 324. The first application server 326 can be associated with (e.g., communicatively connected to) the first data network 304. The communication device 310 and the first application server 326 can communicate data traffic to each other while the communication device 310 is located at the first location 322 or as the communication device 310 moves from the first location to other locations.

The CMC 308, and/or other components (e.g., UPF(s) or AMF(s), RAN(s)) of the mobile communication network 302, can monitor and track movement of the communication device 310 based at least in part on location information associated with the communication device 310. For example, if the communication device 310 moves from the first location 322 to a second location 328, the CMC 308 can receive second location information from network components (e.g., RAN 330, UPF 312, UPF 314, AMF 316, or AMF 318) or the communication device 310. The CMC 308 can analyze second location information (e.g., tracking area information, cell location information, registration area information, or geo-location information) associated with the communication device 310. Based at least in part on the results of analyzing the second location information, the CMC 308 can determine that the communication device 310 has moved and can determine the second location 328 of the communication device 310. In some instances, the second location 328 can be a significant distance away (e.g., 100 miles away, 200 miles away, 300 miles away, or some other significant distance greater than or less than 300 miles away) from the first location 322, such that communication conditions can be affected or impacted (e.g., negatively affected or impacted) due in part to the communication device 310 being connected to the first UPF 312.

In that regard, in some embodiments, the CMC 308, and/or other components of the mobile communication network 302, also can monitor and track communication conditions (e.g., jitter, latency, data packet loss, and/or throughput) associated with the data session between the communication device 310 and the first application server 326 as the communication device 310 accesses or uses the application 324. For example, the CMC 308 can determine and track the amount of jitter, the amount of latency, the amount of data packet loss, and/or the amount of throughput of the data traffic between the communication device 310 and the first application server 326.

While the communication device 310 is at the second location 328, the CMC 308 can receive communication conditions information relating to the communication conditions associated with the data session from one or more network components or devices (e.g., RAN 330, first UPF 312, second UPF 314, AMF 316, or AMF 318) of the mobile communication network 302 or the communication device 310. Based at least in part on the results of analyzing the communication conditions information, the CMC 308 can determine the communication conditions (e.g., jitter, latency, data packet loss, or throughput) associated with the data session between the communication device 310 and the first application server 326. The CMC 308 also can analyze (e.g., compare) the respective values (e.g., amounts, levels, numbers, or percentages) of the respective communication conditions in relation to the respective defined threshold values applicable to the respective communication conditions, as more fully described herein.

If, based at least in part on the results of such analysis, the CMC 308 determines that none of the communication conditions associated with the data session breach the respective defined threshold values applicable to the respective communication conditions, the CMC 308 can determine that the traffic flow for the data session is acceptable, in accordance with the defined communication management criteria, and can determine that the data session can continue to use the first UPF 312 (e.g., while the communication device 310 is located at the second location 328).

If, instead, based at least in part on the results of analyzing the communication conditions information, the CMC 308 determines that one or more communication conditions (e.g., jitter, latency, data packet loss, and/or throughput) associated with the data session does breach the defined threshold value(s) applicable to that communication condition(s), the CMC 308 can determine whether to change the first UPF 312 for the communication device 310 and/or data session, in accordance with defined communication management criteria, to facilitate improving communication conditions associated with the communication device 310 and/or the data session.

In certain embodiments, in response to determining that a communication condition(s) has breached an applicable defined threshold value, the CMC 308 can determine whether an interruption of the data session for the communication device 310 for up to a defined period of time (e.g., 100 milliseconds or less) is permitted, in accordance with the defined communication management criteria, the set of characteristics associated with the application 324, and/or the set of preferences or specifications associated with the communication device 310. For instance, if, based at least in part on the results of analyzing the set of characteristics associated with the application 324 and/or the set preferences or specifications, the CMC 308 determines that such an interruption of the data session is not permitted, the CMC 308 can determine whether there is a second (e.g., local) UPF (e.g., UPF 314) in relative proximity to the second location 328 that can serve the communication device 310 with regard to the data session with the application 324. In this regard, the CMC 308 also can determine whether there is a second data network (e.g., data network 306) and second application server (e.g., application server 332) associated with the application 324 in relative proximity to the second location 328, wherein the second data network 306 can be associated with the second UPF 314 and the second application server 332. For example, the CMC 308 can determine whether there is a second UPF, second data network, and/or second application server that are within a defined distance of the second location 328 or RAN 330, or are in closer proximity to the second location 328 or RAN 330 than the first UPF 312, first data network 304, and/or first application server 326, respectively.

If the CMC 308 determines that such interruption of the data session for up to the defined amount of time is not permitted, the CMC 308 can determine whether there is another UPF (e.g., UPF 314) in proximity to the second location 328 that can provide improved communication conditions for the data session, as compared to the first UPF 312. If the CMC 308 determines that there is not another UPF in proximity to the second location 328 that can provide improved communication conditions for the data session, the CMC 308 can determine that the data session can continue to use the first UPF 312.

If, instead, the CMC 308 determines that there is another UPF (e.g., second UPF 314) in proximity to the second location 328 that can provide improved communication conditions for the data session (e.g., as compared to the first UPF 312), the CMC 308 can determine that the data session is to be switched from being served by the first UPF 312 to have the communication device 310 and data session served by the second UPF 314, and the CMC 308 can add or facilitate adding the second UPF 314 to the communication path associated with the communication device 310 and data session (e.g., insert or facilitate inserting the second UPF 314 in the 5G or other next generation user plane as an uplink classifier), wherein the first UPF 312 can remain in the communication path of the communication device 310 and continue to serve as a mobility anchor for the communication device 310 and data session. The CMC 308 also can configure or facilitate configuring local destination IP offload criteria in connection with the transition to the second UPF 314. The CMC 308 can switch (e.g., transition or redirect) or facilitate switching the communication device 310 and the data session from being served by the first UPF 312 to being served by the second UPF 314, and can facilitate connecting the second UPF 314 to the communication device 310, wherein the second UPF 314 can serve the communication device 310 from that point in the data session, instead of the first UPF 312 serving the communication device 310. While the first UPF 312 can remain in the communication path, data traffic for the data session does not have to be routed through the first UPF 312. The second UPF 314 can provide a local data traffic offload without the data traffic flow of the data session reaching, or being communicated via, the first UPF 312.

The CMC 308 also can facilitate synchronization of information relating to the data session between the communication device 310, the second UPF 314, second data network 306, and/or second application server 332 to facilitate desirable continuation of the data session. The same IP address and/or same application level ID (e.g., unique application level ID) associated with the communication device 310 with respect to the data session can continue to be used for the data session after switching to have the communication device 310 served by the second UPF 314.

In some embodiments, alternatively or additionally, if the CMC 308 determines that an interruption of the data session for up to the defined period of time is permitted, in accordance with the set of characteristics associated with the application 324, the set of preferences or specifications associated with the communication device 310, and/or the defined communication management criteria, the CMC 308 can determine whether there is another UPF (e.g., second UPF 314) in relative proximity to the second location 328 (e.g., as compared to the first UPF 312), as well as an associated data network (e.g., second data network 306) and/or another application server (e.g., second application server 332) associated with the application 324 in relative proximity to the second location 328. If the CMC 308 determines that there is another UPF (e.g., second UPF 314) in relative proximity to the second location 328, and another data network (e.g., second data network 306) and/or application server (e.g., second application server 332) associated with the application 324 in relative proximity to the second location 328, the CMC 308 can determine that the communication device 310 can be switched from the first UPF 312 to the second UPF 314. Based on such determinations, the CMC 308 can communicate a request message to the communication device 310 to request that the communication device 310 deactivate, to facilitate terminating a first connection with the first UPF 312 and terminate the data session, and reactivate to initiate and/or establish connection of the communication device 310 with the second UPF 314 to initiate and/or establish a second data session between the communication device 310 and the second application server 332 associated with the application 324. In response to the request message, the communication device 310 can deactivate to facilitate terminating the first connection with the first UPF 312 and terminating the data session, and can reactivate to initiate and/or establish a second connection with the second UPF 314, and can initiate and/or establish the second data session between the communication device 310 and the second application server 332, via the second UPF 314 and second data network 306.

The CMC 308 also can facilitate synchronizing information relating to the terminated data session between the communication device 310 and the second UPF 314, second data network 306, and/or second application server 332 to facilitate desirable initiation of the second data session and use of the application 324 by the communication device 310. The CMC 108 can communicate or facilitate communicating the new IP address (e.g., second IP address) associated with the communication device 310 to the second data network 306 and/or second application server 332 to facilitate informing the second application server 332 of the new IP address. Data traffic associated with the second data session can be communicated between the communication device 310 and the second application server 332 via the second UPF 314 and second data network 306.

When mobile data session continuity does not have to be maintained (e.g., when interruption in the data session is permitted), there can be instances where the user of the communication device 310 can desire to control the data path switch (e.g., UPF switch to the second UPF 314) associated with the communication device 310. In some embodiments, the CMC 308 can enable the user to control such data path switch, in accordance with the defined communication management criteria, as more fully described herein.

If the communication device 310 moves from the second location 328 to a third location (or a fourth location, and so on), the CMC 308 can perform same or similar operations, such as more fully described herein, to determine whether a communication condition has been breached, whether a switch is to be made to a third UPF, third data network, and/or third application server associated with the application 324, in accordance with the defined communication management criteria. For instance, if the first location 322 was Los Angeles, Calif. and the second location 328 was Las Vegas, Nevada, if the communication device 310 is moved to a third location of San Antonio, Tex. (or New York, N.Y., or other geographic location), the CMC 308 can continue to track and measure communication conditions associated with the communication device 310 (as well as the location of the device 310), and can determine whether a communication condition has been breached (e.g., while the communication device 310 is at the third location), whether a switch is to be made to a third UPF, third data network, and/or third application server associated with the application 324, in accordance with the defined communication management criteria, as more fully described herein. If there is a switch to a third UPF in proximity to the third location (e.g., where mobile data session continuity is being maintained without interruption), the CMC 308 can add or insert, or facilitate adding or inserting, the third UPF in the communication path associated with the communication device 310 and first UPF 312, and can delete or remove, or facilitate deleting or removing, the second UPF 314 from the communication path.

Figure 4:
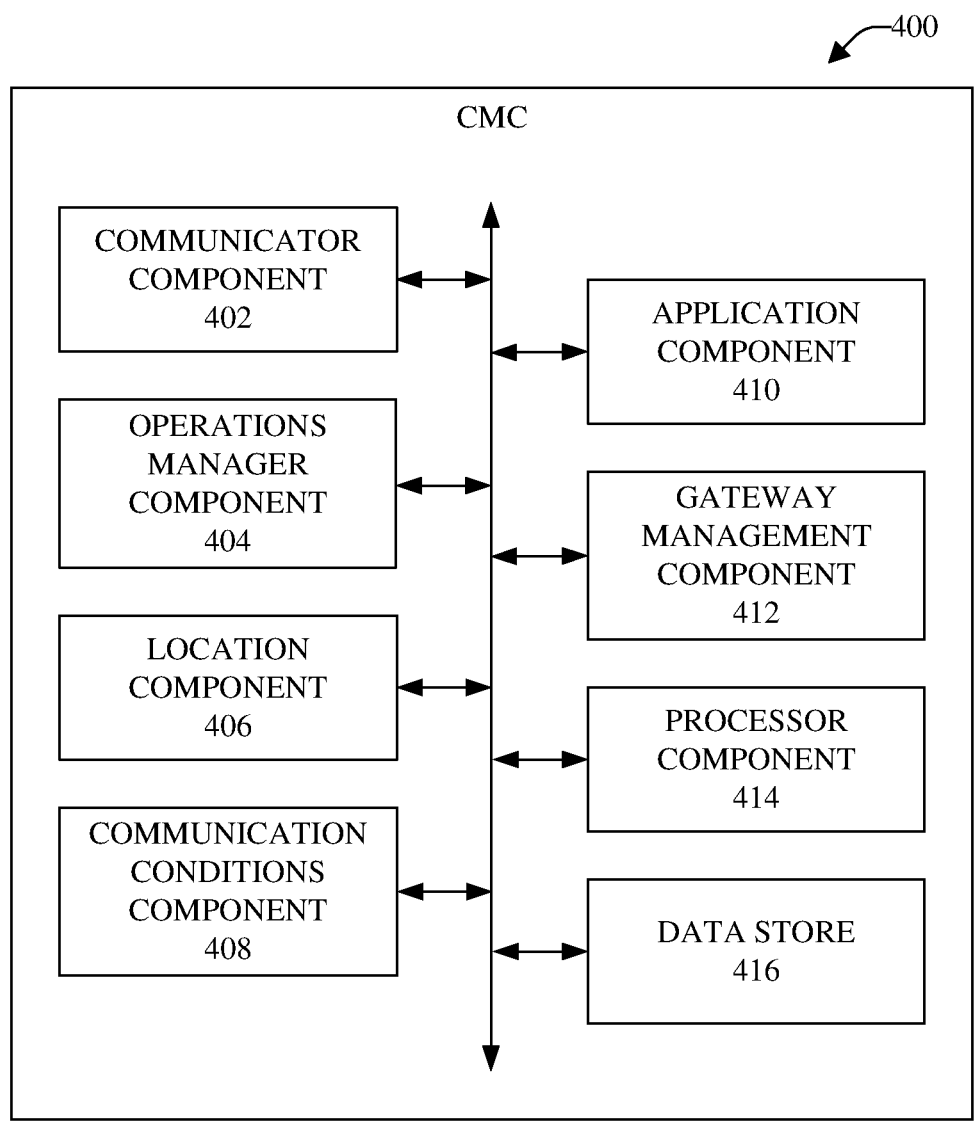
FIG. 4 depicts a block diagram of an example communication management component, in accordance with various aspects and embodiments of the disclosed subject matter.

FIG. 4 depicts a block diagram of an example CMC 400, in accordance with various aspects and embodiments of the disclosed subject matter. The CMC 400 can comprise, for example, a communicator component 402, an operations manager component 404, a location component 406, a communication conditions component 408, an application component 410, a gateway management component 412, a processor component 414, and a data store 416.

The communicator component 402 can transmit and/or receive information from the CMC 400 to network components (e.g., RAN, PGW, SGW, UPF, MME, or AMF, . . . ), data networks, application servers, applications, communication devices, or other components or devices. For instance, the communicator component 402 can receive (e.g., from another network component or a communication device) information, such as location information relating to (e.g., indicating) a location of a communication device or communication conditions information relating to (e.g., indicating) communication conditions associated with the communication device. The communicator component 402 also can transmit instructions relating to transitioning from one serving network component (e.g., SGW or UPF) to another serving network component to the respective serving network components to facilitate such transitioning, transmit instructions relating to transitioning from one anchor network component (e.g., PGW or UPF) to another anchor network component to the respective anchor network components to facilitate such transitioning, transmit a deactivation/reactivation request to a communication device, and/or transmit other desired information to other network components, data networks, application servers, applications, communication devices, or other components or devices, such as described herein.

The operations manager component 404 can control (e.g., manage) operations associated with the CMC 400. For example, the operations manager component 404 can facilitate generating instructions to have components of the CMC 400 perform operations, and can communicate or facilitate communicating (e.g., via the communicator component 402) respective instructions to respective components (e.g., communicator component 402, location component 406, communication conditions component 408, application component 410, gateway management component 412, processor component 414, and/or data store 416, . . . ) of the CMC 400 to facilitate performance of operations by the respective components of the CMC 400 based at least in part on the instructions, in accordance with the defined communication management criteria and a communication management algorithm(s) (e.g., communication management algorithms as disclosed, defined, recited, or indicated herein by the methods, systems, and techniques described herein). The operations manager component 404 also can facilitate controlling data flow between the respective components of the CMC 400 and controlling data flow between the CMC 400 and another component(s) or device(s) (e.g., network component of the communication network, a communication device, data network, application server, application) associated with (e.g., connected to) the CMC 400.

The location component 406 can determine the locations of communication devices based at least in part on location information received from a RAN, an SGW, a PGW, a UPF, an MME, an AMF, or other network component, or from a communication device. The location information can indicate the location, movement, and/or direction of movement of a communication device. For instance, based at least in part on the results of analyzing location information associated with a communication device, the location component 406 can determine a location of the communication device, determine whether the communication device is moving, and/or determine a direction of movement of the communication device.

The communication conditions component 408 can determine communication conditions (e.g., jitter, latency, data packet loss, and/or throughput, . . . ) associated with communication devices based at least in part on communication conditions information received from a RAN, an SGW, a PGW, a UPF, an MME, an AMF, or other network component, or from a communication device. The communication conditions information can indicate the respective communication conditions associated with a communication device (e.g., a data session associated with the communication device). For example, based at least in part on the results of analyzing communications information associated with a communication device, the communication conditions component 408 can determine communication conditions associated with the communication device. The communication conditions component 408 also can determine whether a communication condition breaches a defined threshold value applicable to such communication condition based at least in part on the results of comparing the communication condition value (e.g., amount, level, number, or percentage) to the applicable defined threshold value.

The application component 410 can analyze a set of characteristics associated an application to determine whether the application can tolerate interruption (e.g., short and temporary interruption) of a data session with a communication device, for example, to change anchor network components for the communication device, determine respective defined threshold values applicable for respective communication conditions, and/or determine preferences of the application (e.g., preferences for desirable or optimal use of the application), etc., based at least in part on the analysis results. The application component 410 also can communicate or facilitate communicating (e.g., via the communicator component 402) with an application server or associated application to facilitate informing an application in a location in proximity to a communication device of a transition of the communication device to a local serving network component or local anchor network component, and transitioning to a local application server, to enable the application to prepare (e.g., dynamically determine and prepare) resource allocation to anticipate movement or potential movement of the communication device to a location served by the application server.

The gateway management component 412 can determine whether to transition a communication device from being served by a first serving network component associated with a first location to being served by a second serving network component associated with a second location, transition a communication device from a first anchor network component associated with the first location to a second anchor network component associated with the second location, based at least in part on the location of the communication device relative to the respective network components, communication conditions associated with the communication device and associated data session, applicable threshold values associated with the respective communication conditions, the set of characteristics associated with the application being utilized by the communication device, the set of preferences or specifications (e.g., service continuity preferences or specifications) associated with the communication device, and/or other factors, in accordance with the defined communication management criteria, such as more fully described herein. When the gateway management component 412 determines that a gateway transition is to be performed, the gateway management component 412 can transition or facilitate transitioning a communication device from one gateway component to another gateway component (e.g., from a first SGW proximate to a first location to a second SGW proximate to a second location; from a first PGW proximate to the first location to a second PGW proximate to the second location; from a first UPF proximate to the first location to a second UPF proximate to the second location).

The processor component 414 can work in conjunction with the other components (e.g., communicator component 402, operations manager component 404, location component 406, communication conditions component 408, application component 410, gateway management component 412, and/or data store 416) to facilitate performing the various functions of the CMC 400. The processor component 414 can employ one or more processors, microprocessors, or controllers that can process data, such as information relating to users of communication devices, applications, application characteristics, preferences or specifications (e.g., service continuity preferences or specifications), location of communication devices, locations of network components (e.g., serving network components, anchor network components), locations of data networks, locations of application servers, communication conditions associated with communication devices, defined threshold values associated with communication conditions, parameters, traffic flows, policies (e.g., communication management policies), defined communication management criteria, algorithms (e.g., communication management algorithm(s)), protocols, interfaces, tools, and/or other information, to facilitate operation of the CMC 400, as more fully disclosed herein, and control data flow between the CMC 400 and other components (e.g., network components of the communication network, data networks, communication devices, base stations, applications, application servers, . . . ) associated with the CMC 400.

The data store 416 can store data structures (e.g., user data, metadata), code structure(s) (e.g., modules, objects, hashes, classes, procedures) or instructions, information relating to users of communication devices, applications, application characteristics, preferences or specifications (e.g., service continuity preferences or specifications), location of communication devices, locations of network components (e.g., serving network components, anchor network components), locations of data networks, locations of application servers, communication conditions associated with communication devices, defined threshold values associated with communication conditions, parameters, traffic flows, policies (e.g., communication management policies), defined communication management criteria, algorithms (e.g., communication management algorithm(s)), protocols, interfaces, tools, and/or other information, to facilitate controlling operations associated with the CMC 400. In an aspect, the processor component 414 can be functionally coupled (e.g., through a memory bus) to the data store 416 in order to store and retrieve information desired to operate and/or confer functionality, at least in part, to the communicator component 402, operations manager component 404, location component 406, communication conditions component 408, application component 410, gateway management component 412, and/or data store 416, etc., and/or substantially any other operational aspects of the CMC 400.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 5:
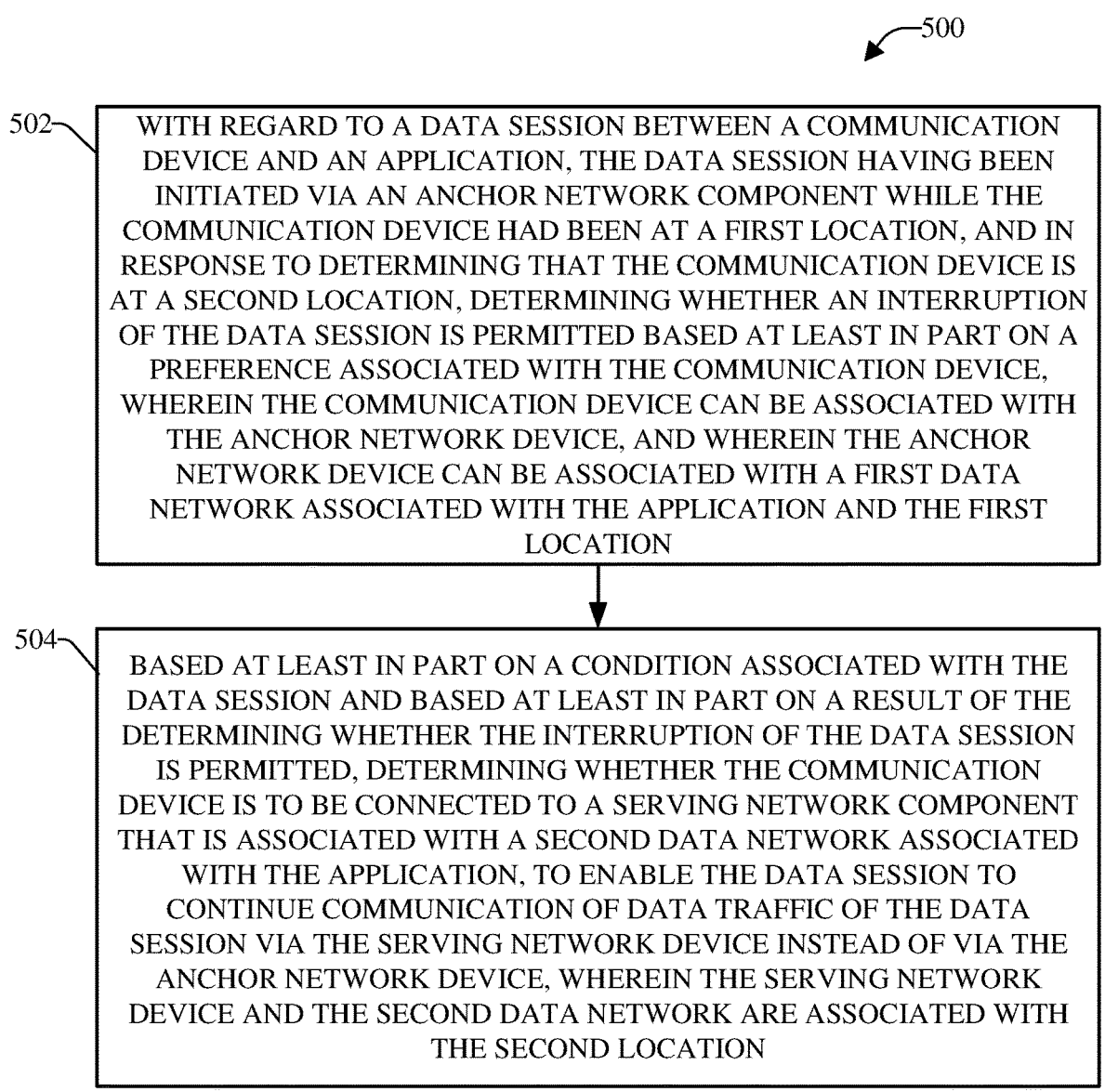
FIG. 5 illustrates a flow chart of an example method that can manage connection of a communication device with anchor network components, serving network components, and other components or devices of or associated with a communication network, and routing of data traffic, in connection with use of an application by the communication device while the communication device is moving, in accordance with various aspects and embodiments of the disclosed subject matter.
Figure 6:
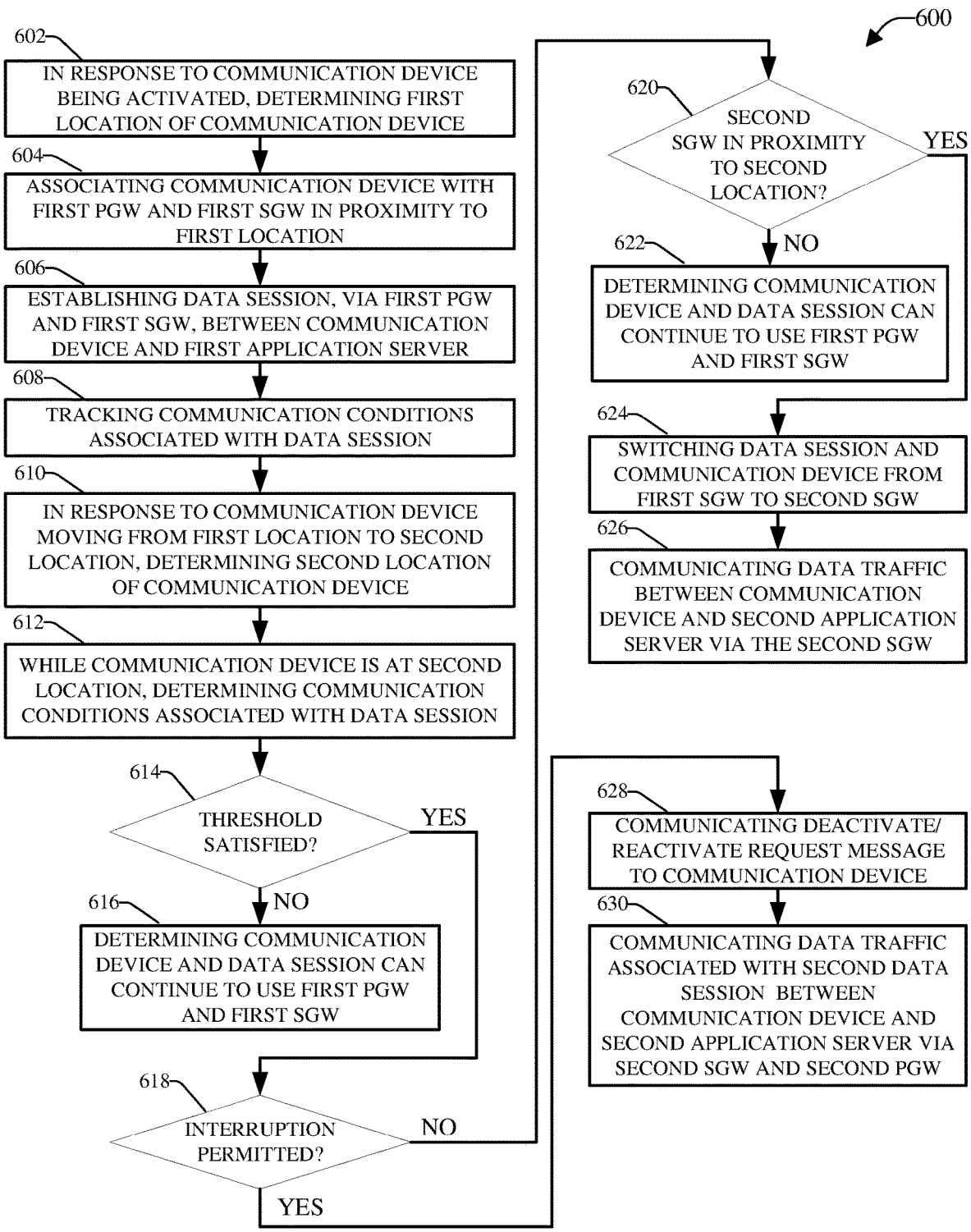
FIG. 6 depicts a flow chart of an example method that can manage connection of a communication device with PGWs, SGWs, and other components or devices of or associated with a communication network, and routing of data traffic, in connection with use of an application by the communication device while the communication device is moving, in accordance with various aspects and embodiments of the disclosed subject matter.
Figure 7:
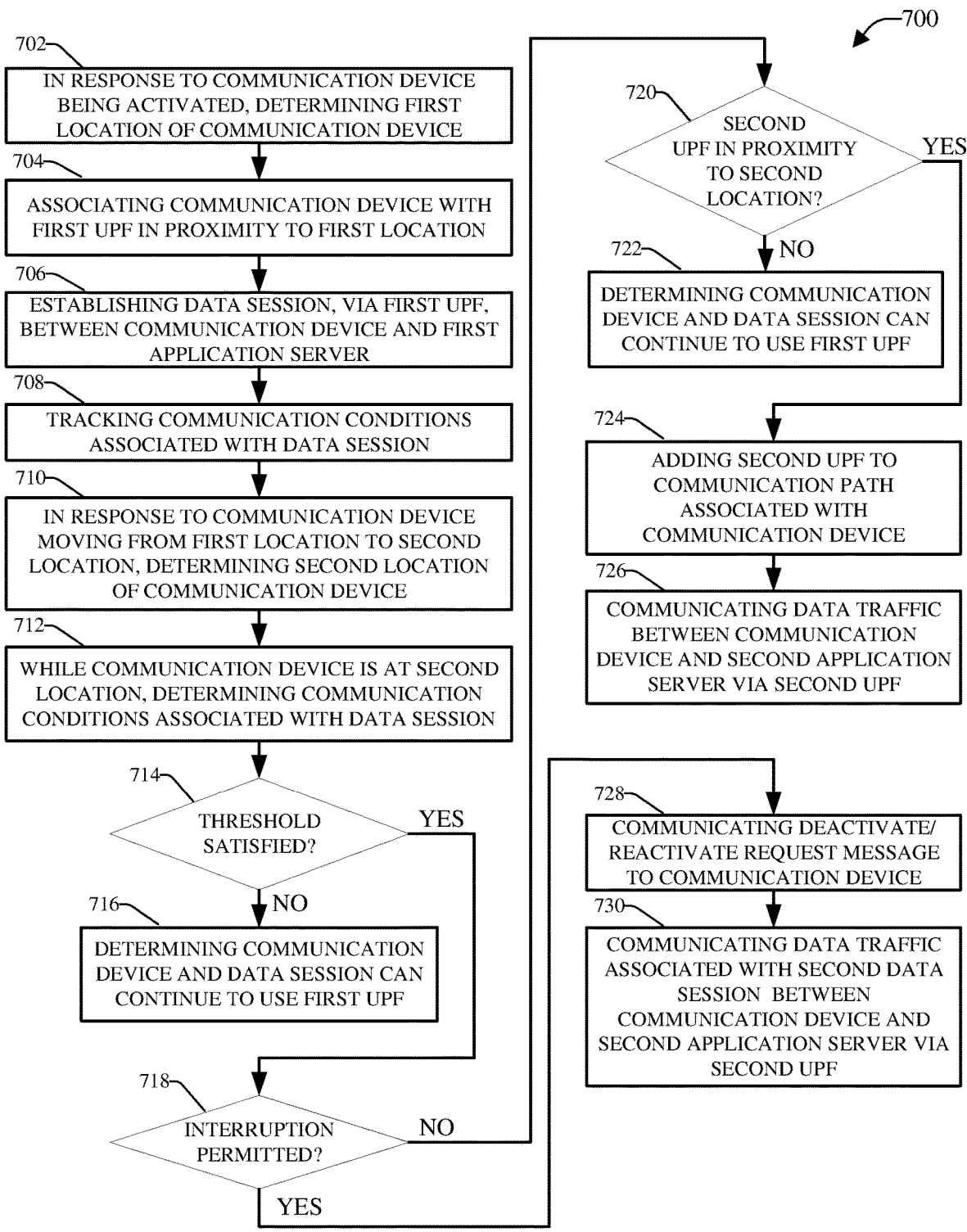
FIG. 7 illustrates a flow chart of an example method that can manage connection of a communication device with UPFs, and other components or devices of or associated with a communication network, and routing of traffic via UPFs, in connection with use of an application by the communication device while the communication device is moving, in accordance with various aspects and embodiments of the disclosed subject matter.

In view of the example systems and/or devices described herein, example methods that can be implemented in accordance with the disclosed subject matter can be further appreciated with reference to flowcharts in FIGS. 5-7. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 5 illustrates a flow chart of an example method 500 that can manage connection of a communication device with anchor network components, serving network components, and other components or devices of or associated with a communication network, and routing of data traffic, in connection with use of an application by the communication device while the communication device is moving, in accordance with various aspects and embodiments of the disclosed subject matter. The method 500 can be employed by, for example, a system comprising the CMC, a processor component (e.g., of or associated with the CMC), a data store (e.g., of or associated with the CMC), an anchor network component(s), a serving network component(s), or other type of network component(s) of the communication network.

At 502, with regard to a data session between a communication device and an application, the data session having been initiated via an anchor network component while the communication device had been at a first location, and in response to determining that the communication device is at a second location, a determination can be made regarding whether an interruption of the data session is permitted based at least in part on a preference associated with the communication device and/or a characteristic associated with the application, wherein the communication device can be associated with the anchor network device, and wherein the anchor network device can be associated with a first data network associated with the application and the first location. While the communication device is located at the first location, in response to activation of the communication device, the communication device can be associated with (e.g., connected to) an anchor network component (e.g., PGW or UPF) and a first serving network component (e.g., SGW, or a serving gateway of the UPF) associated with (e.g., located in proximity to) the first location. A data session can be initiated and established between the communication device and a first application server associated with the application via the first data network, anchor network component, and first serving network component, wherein the first application server, first data network, and first serving network component also can be in relative proximity to the first location.

At some point, the communication device can move to a second location, which can be a significant distance (e.g., 100 miles, 200 miles, 300 miles, or greater than or less than 300 miles) away from the first location. In response to determining that the communication device is at the second location (e.g., based at least in part on the results of analyzing location information associated with the communication device), the CMC can determine whether an interruption of the data session is permitted based at least in part on the preference (e.g., service continuity preference) associated with the communication device and/or the characteristic associated with the application, as more fully described herein.

At 504, based at least in part on a condition associated with the data session and based at least in part on a result of the determining whether the interruption of the data session is permitted, a determination can be made regarding whether the communication device is to be connected to a serving network component that is associated with a second data network associated with the application, to enable the data session to continue communication of data traffic of the data session via the serving network device instead of via the anchor network device, wherein the serving network device and the second data network are associated with the second location. The CMC can receive and analyze communication conditions information regarding one or more conditions (e.g., communication conditions) associated with the data session and communication. Based at least in part on a condition associated with the data session (e.g., based at least in part on the results of analyzing the communication conditions information), and based at least in part on the results of the determining of whether the interruption of the data session is permitted, the CMC can determine whether the communication device is to be connected to the serving network component that is associated with the second data network associated with the application to enable the data session to continue communication of data traffic of the data session via the serving network device instead of via the anchor network device, wherein the serving network device and the second data network can be associated with the second location. For instance, if the CMC determines that such an interruption of the data session is not permitted (e.g., based at least in part on the results of analyzing the preference associated with the communication device and/or the characteristic associated with the application), and if the CMC determines that a communication condition associated with the data session has been breached, the CMC can determine whether there is a serving network component in proximity to the second location that can serve the communication device with regard to the data session to improve the communication condition associated with the data session. In connection with such determination regarding the serving network component, the CMC can determine whether there is a second data network and second application server associated with the application that are associated with the serving network component and/or in proximity to the second location that can facilitate improving the communication condition associated with the data session.

In response to determining that there is a serving network component (and/or associated second data network and second application server) in proximity to the second location that can serve the communication device with regard to the data session and improve the communication condition associated with the data session, the CMC can determine that the communication device is to be switched from the first serving network component associated with the first location to the serving network component (e.g., second serving network component) associated with the second location. The CMC can facilitate switching the communication device from the first serving network component associated with the first location to the second serving network component associated with the second location. The communication device can continue to be associated with the anchor network component associated with the first location such that the anchor network component can continue to be the mobility anchor for the data session. The second serving network component can be enhanced to communicate with the second data network and second application server to communicate data traffic of the data session between the communication device and second application server without routing the data traffic through the anchor network component, as more fully described herein.

FIG. 6 depicts a flow chart of an example method 600 that can manage connection of a communication device with PGWs, SGWs, and other components or devices of or associated with a communication network, and routing of data traffic, in connection with use of an application by the communication device while the communication device is moving, in accordance with various aspects and embodiments of the disclosed subject matter. The method 600 can be employed by, for example, a system comprising the CMC, a processor component (e.g., of or associated with the CMC), a data store (e.g., of or associated with the CMC), an SGW(s), a PGW(s), or other type of network component(s) of the communication network.

At 602, in response to the communication device being activated, a first location of the communication device can be determined based at least in part on first location information associated with the communication device. In response to the communication device being activated (e.g., turned on or otherwise activated), the CMC can determine the first location of the communication device based at least in part on the first location information associated with the communication device, wherein the first location information can indicate the first location of the communication device. The first location information can comprise, for example, tracking area information, cell location information, registration area information, or geo-location information associated with the communication device or one or more base stations in proximity to the communication device.

At 604, the communication device can be associated with a first PGW and a first SGW determined to be in proximity to the first location of the communication device. The CMC can determine the first PGW and the first SGW that are located in proximity to the first location of the communication device. For instance, the first PGW can serve as an anchor point (e.g., an anchor network device) for communication devices, such as the communication device, located in a region, comprising the first location, covered by the first PGW. The first PGW can be associated with a first data network (e.g., first packet data network), wherein one or more applications can be associated with and accessed (e.g., by communication devices) via the first data network. The first SGW can be associated with the first PGW and can serve as a serving gateway for communication devices, such as the communication device, located in a first portion of the region, comprising the first location.

At 606, a data session can be established, via the first PGW and the first SGW, between the communication device and a first application server associated with an application. The CMC can establish or facilitate establishing, via the first PGW and the first SGW, the data session (e.g., mobile data session) between the communication device and the first application server associated with the application. The first application server can be associated with (e.g., communicatively connected to) the first data network.

At 608, communication conditions associated with the data session can be tracked. The CMC can track (e.g., monitor and track) the communication conditions associated with the data session between the communication device and the first application server associated with the application as the communication device accesses or uses the application. The communication conditions can comprise, for example, jitter, latency (e.g., delay), data packet loss, and/or throughput of the data traffic between the communication device and the first application server. For instance, the CMC can track the amount of jitter, the amount of latency, the amount of data packet loss, and/or the amount of throughput of the data traffic between the communication device and the first application server.

At 610, in response to the communication device moving from the first location to a second location, the second location of the communication device can be determined based at least in part on second location information associated with the communication device. In response to the communication device moving from the first location to the second location, the CMC can determine that the communication device has moved and can determine the second location of the communication device based at least in part on the second location information associated with the communication device, wherein the second location information can indicate the second location of the communication device. The second location information can comprise, for example, tracking area information, cell location information, registration area information, or geo-location information associated with the communication device or one or more base stations in proximity to the communication device.

At 612, while the communication device is at the second location, communication conditions associated with the data session can be determined. In connection with the communication device being at the second location, the CMC can receive condition information relating to the communication conditions associated with the data session from network devices of the communication network or the communication device. The CMC can analyze the condition information relating to the communication conditions. The CMC can determine the communication conditions associated with the data session based at least in part on the results of analyzing the condition information relating to the communication conditions associated with the data session.

At 614, a determination can be made regarding whether a communication condition associated with the data session satisfies (e.g., breached) a defined threshold value relating to the condition. The CMC can analyze (e.g., compare) the respective values (e.g., amounts or levels) of the respective communication conditions in relation to the respective defined threshold values applicable to the respective communication conditions (e.g., jitter, latency, data packet loss, or throughput associated with the communication device), as more fully described herein.

If, based at least in part on the results of such analysis, it is determined that none of the communication conditions associated with the data session satisfy (e.g., breach) the respective defined threshold values applicable to the respective communication conditions, at 616, it can be determined that the communication device and the data session can continue to use the first PGW and first SGW. If, based at least in part on the results of such analysis, the CMC determines that none of the communication conditions associated with the data session breach the respective defined threshold values applicable to the respective communication conditions, the CMC can determine that the traffic flow for the data session is acceptable, and the communication device and the data session can continue to use the first PGW and first SGW.

Referring again to reference numeral 614, if, at 614, it is determined that a communication condition associated with the data session does satisfy (e.g., breach) the defined threshold value applicable to that communication condition, at 618, a determination can be made regarding whether an interruption of the data session for a defined amount of time is permitted based at least in part on a set of preferences associated with the communication device and/or a set of characteristics associated with the application. The CMC can analyze preference information relating to the set of preferences and/or characteristics information relating to the set of characteristics. One or more preferences of the set of preferences and/or one or more characteristics of the set of characteristics can indicate whether an interruption (e.g., temporary suspension or cessation) of the data session for up to the defined amount of time is permitted. Based at least in part on the results of the analysis of the preference information of the set of preferences and/or characteristics information of the set of characteristics, the CMC can determine whether the interruption of the data session for the defined amount of time (e.g., approximately 100 milliseconds or less) is permitted.

In response to determining that the interruption of the data session for the defined amount of time is not permitted, at 620, it can be determined whether there is a second SGW in proximity to the second location that can provide improved communication conditions for the data session. In response to determining that the interruption of the data session for the defined amount of time is not permitted, and based at least in part on the communication condition being determined to satisfy the defined threshold value applicable with respect to that communication condition, the CMC can determine whether there is a second SGW in proximity to the second location that can provide improved communication conditions for the data session, as compared to the first SGW and first PGW.

If it is determined that there is not a second SGW in proximity to the second location that can provide improved communication conditions for the data session, at 622, it can be determined that the communication device and the data session can continue to use the first PGW and first SGW. If the CMC determines that there is not a second SGW in proximity to the second location that can provide improved communication conditions for the data session, the CMC determine that the communication device and the data session can continue to use the first PGW and first SGW.

Referring back to reference numeral 620, if, at 620, it is determined that there is a second SGW in proximity to the second location that can provide improved communication conditions for the data session, at 624, the data session can be switched from the first SGW to the second SGW, wherein the communication device can be connected to the second SGW. In response to determining that there is a second SGW in proximity to the second location that can provide improved communication conditions for the data session, the CMC can switch the data session from the first SGW to the second SGW, and can facilitate connecting the second SGW to the communication device, wherein the second SGW can serve the communication device from that point in the data session, instead of the first SGW. The communication device can continue to be connected to the first PGW associated with the first location.

At 626, data traffic associated with the data session can be communicated between the communication device and a second application server associated with the application via the second SGW, wherein the second application server can be associated with a second data network associated with the second SGW and in proximity to the second location. The second SGW can be associated with (e.g., communicatively connected to) the second data network (e.g., second packet data network) that can be located in relative proximity to the second location (e.g., as compared to the location of the first data network). The second application server associated with the application can be associated with (e.g., communicatively connected to) the second data network.

The CMC can facilitate (e.g., enable) the communication device to synchronize information relating to the data session with the second SGW, second data network, and/or second application server to facilitate desirable continuation of the data session. Data traffic associated with the data session can be communicated between the communication device and the second application server via the second data network and the second SGW, without routing of data traffic through the first PGW.

Referring again to reference numeral 618, if, at 618, it is determined that the interruption of the data session for the defined amount of time is permitted, at 628, a request message can be communicated to the communication device, wherein the request message can request the communication device to deactivate, to facilitate terminating a first connection with the first PGW and terminating the data session, and reactivate to connect the communication device with a second PGW, in proximity to the second location, to establish a second data session between the communication device and the second application server associated with the application. In response to determining that the interruption of the data session for the defined amount of time is permitted, the CMC can communicate the request message to the communication device. In response to the request message, the communication device can deactivate to facilitate terminating the first connection with the first PGW and terminating the data session, and can reactivate to establish a second connection with the second PGW, and can establish the second data session between the communication device and the second application server associated with the application. In connection with connecting to the second PGW, the communication device also can be connected to the second SGW.

At 630, data traffic associated with the second data session can be communicated between the communication device and the second application server via the second SGW and second PGW. The CMC can facilitate synchronization of information relating to the terminated data session between the communication device and the second PGW, second SGW, second data network, and/or second application server to facilitate desirable initiation of the second data session and use of the application by the communication device. Data traffic associated with the second data session can be communicated between the communication device and the second application server via the second PGW, second SGW, and second data network.

FIG. 7 illustrates a flow chart of an example method 700 that can manage connection of a communication device with UPFs, and other components or devices of or associated with a communication network, and routing of traffic via UPFs, in connection with use of an application by the communication device while the communication device is moving, in accordance with various aspects and embodiments of the disclosed subject matter. The method 700 can be employed by, for example, a system comprising the CMC, a processor component (e.g., of or associated with the CMC), a data store (e.g., of or associated with the CMC), UPFs, or another type of network component of the communication network.

At 702, in response to the communication device being activated, a first location of the communication device can be determined based at least in part on first location information associated with the communication device. In response to the communication device being activated (e.g., turned on or otherwise activated), the CMC can determine the first location of the communication device based at least in part on the first location information (e.g., tracking area information, cell location information, registration area information, or geo-location information) associated with the communication device, wherein the first location information can indicate the first location of the communication device.

At 704, the communication device can be associated with a first UPF determined to be in proximity to the first location of the communication device. The CMC can determine the first UPF that can be located in relative proximity to the first location of the communication device, as compared to the locations of other UPFs in relation to the communication device. The first UPF can serve as an anchor point (e.g., an anchor network component) and also as a serving gateway (e.g., serving gateway component) for communication devices, such as the communication device, located in a region, comprising the first location, covered by the first UPF. The first UPF can be associated with a first data network (e.g., first packet data network), wherein one or more applications can be associated with and accessed (e.g., by communication devices) via the first data network.

At 706, a data session can be established, via the first UPF, between the communication device and a first application server associated with an application. The CMC can establish or facilitate establishing, via the first UPF, the data session (e.g., mobile data session) between the communication device and the first application server associated with the application. The first application server can be associated with (e.g., communicatively connected to) the first data network.

At 708, communication conditions associated with the data session can be tracked. The CMC can track (e.g., monitor and track) the communication conditions (e.g., jitter, latency, data packet loss, and/or throughput) associated with the data session between the communication device and the first application server associated with the application as the communication device accesses or uses the application.

At 710, in response to the communication device moving from the first location to a second location, the second location of the communication device can be determined based at least in part on second location information associated with the communication device. In response to the communication device moving from the first location to the second location, the CMC can determine that the communication device has moved and can determine the second location of the communication device based at least in part on the second location information associated with the communication device, wherein the second location information can indicate the second location of the communication device.

At 712, while the communication device is at the second location, communication conditions associated with the data session can be determined. In connection with the communication device being at the second location, the CMC can receive condition information relating to the communication conditions (e.g., jitter, latency, data packet loss, and/or throughput) associated with the data session from network devices of the communication network or the communication device. The CMC can analyze the condition information relating to the communication conditions. The CMC can determine the communication conditions associated with the data session based at least in part on the results of analyzing the condition information relating to the communication conditions associated with the data session.

At 714, a determination can be made regarding whether a communication condition associated with the data session satisfies a defined threshold value relating to the condition. The CMC can analyze (e.g., compare) the respective values (e.g., amounts or levels) of the respective communication conditions in relation to the respective defined threshold values applicable to the respective communication conditions. With regard to each type of communication condition, the CMC can compare the value (e.g., amount, level, number, or percentage) of such communication condition for the data session to the defined threshold value of such communication condition to determine whether the value of such communication condition satisfies (e.g., breaches) the defined threshold value of such communication condition, as more fully described herein.

If it is determined that none of the communication conditions associated with the data session satisfy (e.g., breach) the respective defined threshold values applicable to the respective communication conditions, at 716, it can be determined that the communication device and the data session can continue to use the first UPF. If the CMC determines that none of the communication conditions associated with the data session breach the respective defined threshold values applicable to the respective communication conditions, the CMC determine that the traffic flow for the data session is acceptable, and the communication device and the data session can continue to use the first UPF.

Referring again to reference numeral 714, if, at 714, it is determined that a communication condition associated with the data session does satisfy (e.g., breach) the defined threshold value applicable to that communication condition, at 718, a determination can be made regarding whether an interruption of the data session for a defined amount of time is permitted based at least in part on a set of preferences associated with the communication device and/or a set of characteristics associated with the application. The CMC can analyze preference information relating to the set of preferences and/or characteristics information relating to the set of characteristics that can indicate whether an interruption (e.g., temporary suspension or cessation) of the data session for up to the defined amount of time is permitted. Based at least in part on the results of the analysis of the preference information of the set of preferences and/or the characteristics information of the set of characteristics, the CMC can determine whether the interruption of the data session for the defined amount of time (e.g., approximately 100 milliseconds or less) is permitted.

In response to determining that the interruption of the data session for the defined amount of time is not permitted, at 720, it can be determined whether there is a second UPF in proximity to the second location that can provide improved communication conditions for the data session. In response to determining that the interruption of the data session for the defined amount of time is not permitted, and based at least in part on the communication condition being determined to satisfy the defined threshold value applicable with respect to that communication condition, the CMC can determine whether there is a second UPF in proximity to the second location that can provide improved communication conditions for the data session, as compared to the first UPF.

If it is determined that there is not a second UPF in proximity to the second location that can provide improved communication conditions for the data session, at 722, it can be determined that the communication device and the data session can continue to use the first UPF. If the CMC determines that there is not a second UPF in proximity to the second location that can provide improved communication conditions for the data session, the CMC determine that the communication device and the data session can continue to use the first UPF.

Referring back to reference numeral 720, if, at 720, it is determined that there is a second UPF in proximity to the second location that can provide improved communication conditions for the data session, at 724, the second UPF can be added to the communication path associated with the communication device, wherein the communication device can be connected to the second UPF, and wherein the second UPF can function as a serving gateway for the communication device. In response to determining that there is a second UPF in proximity to the second location that can provide improved communication conditions for the data session, the CMC can add (e.g., insert) the second UPF to (into) the communication path associated with the communication device, wherein the communication device can be connected to the second UPF. The first UPF can remain in the communication path associated with the communication device, wherein the first UPF can continue to act as an anchor point (e.g., anchor network component) for the communication device. The second UPF essentially can act or function as the serving gateway for the communication device from that point in the data session, instead of the first UPF handling the serving gateway functions for the data session.

At 726, data traffic associated with the data session can be communicated between the communication device and a second application server associated with the application via the second UPF, wherein the second application server can be associated with a second data network associated with the second UPF and in proximity to the second location. The second UPF can be associated with (e.g., communicatively connected to) the second data network that can be located in relative proximity to the second location (e.g., as compared to the location of the first data network). The second application server associated with the application can be associated with the second data network.

The CMC can facilitate (e.g., enable) the communication device to synchronize information relating to the data session with the second UPF, second data network, and/or second application server to facilitate desirable continuation of the data session. Data traffic associated with the data session can be communicated between the communication device and the second application server via the second data network and the second UPF, without routing of data traffic through the first UPF.

Referring again to reference numeral 718, if, at 718, it is determined that the interruption of the data session for the defined amount of time is permitted, at 728, a request message can be communicated to the communication device, wherein the request message can request the communication device to deactivate the data session, to facilitate terminating a first connection with the first UPF, and reactivate to connect the communication device with the second UPF, in proximity to the second location, to establish, via the second UPF, a second data session between the communication device and the second application server associated with the application. In response to determining that the interruption of the data session for the defined amount of time is permitted, the CMC can communicate the request message to the communication device. In response to the request message, the communication device can deactivate to facilitate terminating the first connection with the first UPF, and can reactivate to establish a second connection with the second UPF, and establish the second data session between the communication device and the second application server associated with the application. The second UPF can function as an anchor point (e.g., anchor network component) and serving gateway for the communication device.

At 730, data traffic associated with the second data session can be communicated between the communication device and the second application server via the second UPF. The CMC can facilitate synchronization of information relating to the terminated data session between the communication device and the second UPF, second data network, and/or second application server to facilitate desirable initiation of the second data session and use of the application by the communication device. Data traffic associated with the second data session can be communicated between the communication device and the second application server via the second UPF and second data network.

Described herein are systems, methods, articles of manufacture, and other embodiments or implementations that can facilitate controlling a group of parameters associated with respective uplink transmissions of respective communication devices (e.g., mobile or wireless communication devices, IoT devices, or other communication devices) associated with a communication network to facilitate improving the respective SINRs and robustness of the respective uplink transmissions, and/or performing other operations in connection with managing communication of data by communication devices associated with the communication network. The controlling of the group of parameters associated with the respective uplink transmissions of the respective communication devices associated with the communication network (e.g., core or wireless network of the communication network), managing communication of data by communication devices associated with the communication network, and/or other features of the disclosed subject matter, can be implemented in connection with any type of device with a connection to the communication network (e.g., a wireless or mobile device, a computer, a handheld device, etc.), any Internet of things (IoT) device (e.g., health monitoring device, toaster, coffee maker, blinds, music players, speakers, etc.), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 8:
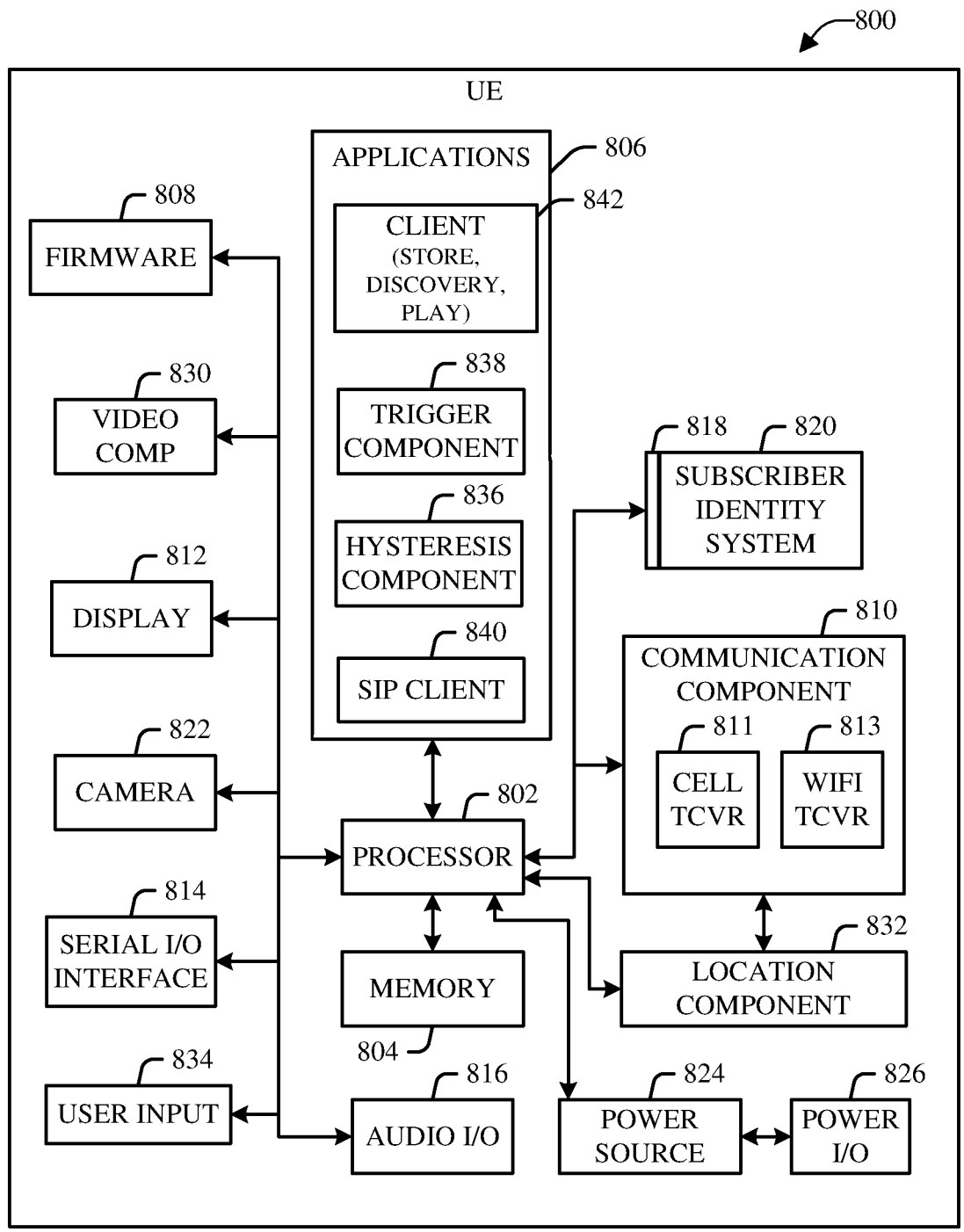
FIG. 8 depicts a block diagram of example user equipment, in accordance with various aspects and embodiments of the disclosed subject matter.

Referring now to FIG. 8, depicted is an example block diagram of an example UE 800 (e.g., wireless, mobile, or smart phone, AR/VR headset, computer, electronic pad or tablet, IoT device, or other type of communication device)

operable to engage in a system architecture that facilitates wireless communications according to one or more embodiments described herein. Although a UE is illustrated herein, it will be understood that other devices can be a communication device, and that the UE is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The UE 800 can include a processor 802 for controlling and processing all onboard operations and functions. A memory 804 interfaces to the processor 802 for storage of data and one or more applications 806 (e.g., a video player software, user feedback component software, etc.). Other applications can include voice recognition of predetermined voice commands that facilitate initiation of the user feedback signals. The applications 806 can be stored in the memory 804 and/or in a firmware 808, and executed by the processor 802 from either or both the memory 804 or/and the firmware 808. The firmware 808 can also store startup code for execution in initializing the UE 800. A communication component 810 interfaces to the processor 802 to facilitate wired/wireless communication with external systems, e.g., cellular networks, VoIP networks, and so on. Here, the communication component 810 can also include a suitable cellular transceiver 811 (e.g., a GSM transceiver) and/or an unlicensed transceiver 813 (e.g., Wi-Fi, WiMax) for corresponding signal communications. The UE 800 can be a device such as a cellular telephone, a PDA with mobile communications capabilities, and messaging-centric devices. The communication component 810 also facilitates communications reception from terrestrial radio networks (e.g., broadcast), digital satellite radio networks, and Internet-based radio services networks.

The UE 800 includes a display 812 for displaying text, images, video, telephony functions (e.g., a Caller ID function), setup functions, and for user input. For example, the display 812 can also be referred to as a "screen" that can accommodate the presentation of multimedia content (e.g., music metadata, messages, wallpaper, graphics, etc.). The display 812 can also display videos and can facilitate the generation, editing and sharing of video quotes. A serial I/O interface 814 is provided in communication with the processor 802 to facilitate wired and/or wireless serial communications (e.g., USB, and/or IEEE 1394) through a hardwire connection, and other serial input devices (e.g., a keyboard, keypad, and mouse). This supports updating and troubleshooting the UE 800, for example. Audio capabilities are provided with an audio I/O component 816, which can include a speaker for the output of audio signals related to, for example, indication that the user pressed the proper key or key combination to initiate the user feedback signal. The audio I/O component 816 also facilitates the input of audio signals through a microphone to record data and/or telephony voice data, and for inputting voice signals for telephone conversations.

The UE 800 can include a slot interface 818 for accommodating a SIC (Subscriber Identity Component) in the form factor of a card Subscriber Identity Module (SIM) or universal SIM 820, and interfacing the SIM card 820 with the processor 802. However, it is to be appreciated that the SIM card 820 can be manufactured into the UE 800, and updated by downloading data and software.

The UE 800 can process IP data traffic through the communication component 810 to accommodate IP traffic from an IP network such as, for example, the Internet, a corporate intranet, a home network, a person area network, etc., through an ISP or broadband cable provider. Thus, VoIP traffic can be utilized by the UE 800 and IP-based multimedia content can be received in either an encoded or a decoded format.

A video processing component 822 (e.g., a camera) can be provided for decoding encoded multimedia content. The video processing component 822 can aid in facilitating the generation, editing, and sharing of video quotes. The UE 800 also includes a power source 824 in the form of batteries and/or an AC power subsystem, which power source 824 can interface to an external power system or charging equipment (not shown) by a power I/O component 826.

The UE 800 can also include a video component 830 for processing video content received and, for recording and transmitting video content. For example, the video component 830 can facilitate the generation, editing and sharing of video quotes. A location tracking component 832 facilitates geographically locating the UE 800. As described hereinabove, this can occur when the user initiates the feedback signal automatically or manually. A user input component 834 facilitates the user initiating the quality feedback signal. The user input component 834 can also facilitate the generation, editing and sharing of video quotes. The user input component 834 can include such conventional input device technologies such as a keypad, keyboard, mouse, stylus pen, and/or touch screen, for example.

Referring again to the applications 806, a hysteresis component 836 facilitates the analysis and processing of hysteresis data, which is utilized to determine when to associate with the access point. A software trigger component 838 can be provided that facilitates triggering of the hysteresis component 836 when the Wi-Fi transceiver 813 detects the beacon of the access point. A SIP client 840 enables the UE 800 to support SIP protocols and register the subscriber with the SIP registrar server. The applications 806 can also include a client 842 that provides at least the capability of discovery, play and store of multimedia content, for example, music.

The UE 800, as indicated above related to the communication component 810, includes an indoor network radio transceiver 813 (e.g., Wi-Fi transceiver). This function supports the indoor radio link, such as IEEE 802.11, for the dual-mode GSM device (e.g., UE 800). The UE 800 can accommodate at least satellite radio services through a device (e.g., handset device) that can combine wireless voice and digital radio chipsets into a single device (e.g., single handheld device).

Figure 9:
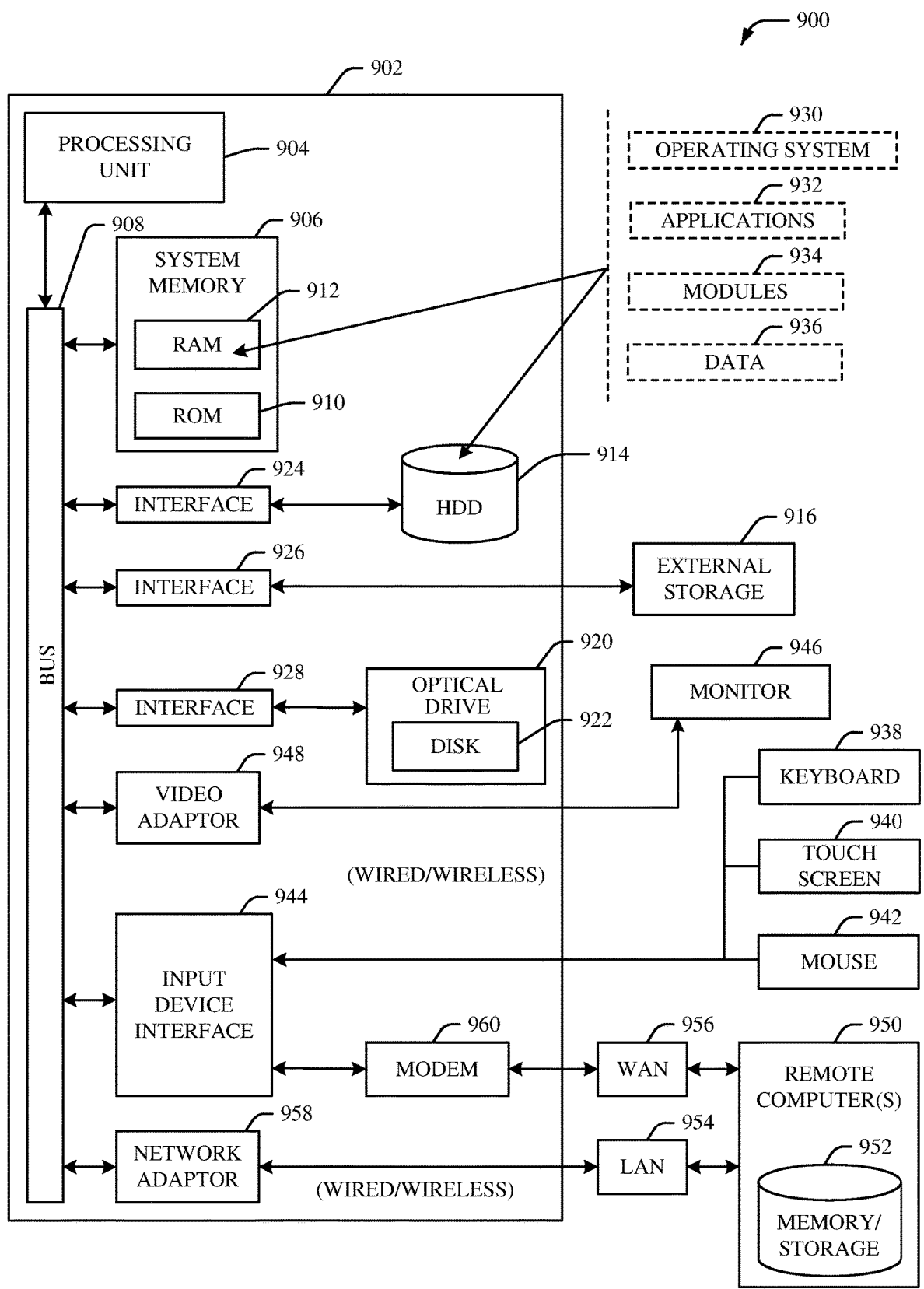
FIG. 9 illustrates an example block diagram of an example computing environment in which the various embodiments of the embodiments described herein can be implemented.

In order to provide additional context for various embodiments described herein, FIG. 9 and the following discussion are intended to provide a brief, general description of a suitable computing environment 900 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956, e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; Bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "communication device," "wireless device," "wireless communication device," "access terminal," "terminal," "handset," "headset," and similar terminology can be used herein to refer to a wireless device utilized by a subscriber or user of a wireless communication service to receive or convey data, control, voice, video, sound, gaming, or substantially any data-stream or signaling-stream. The foregoing terms can be utilized interchangeably in the subject specification and related drawings. Likewise, the terms "access point" (AP), "base station," "node B," "evolved node B" (eNode B or eNB), "home node B" (HNB), "home access point" (HAP), and the like can be utilized interchangeably in the subject application, and can refer to a wireless network component or appliance that serves and receives data, control, voice, video, sound, gaming, or substantially any data-stream or signaling-stream from a set of subscriber stations. Data and signaling streams can be packetized or frame-based flows.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise determining and generating interactive content, controlling presentation of a portion of the interactive content, controlling implementation (e.g., execution) of control content of interactive content, controlling implementation of haptic content of interactive content, determining an entertainment experience (e.g., experience comprising or related to interactive content) that potentially can be desired or appropriate for a user(s) (e.g., an occupant(s) of a vehicle), recommending an entertainment experience to a user(s), determining whether a vehicle action sequence can be performed by a vehicle, notifying a second vehicle that is or is projected to be in proximity to a vehicle that the vehicle is intending to perform a vehicle action sequence, inviting the second vehicle to participate in the vehicle action sequence, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, the orchestrator component, agent component, sensor component, vehicle systems or components, communication devices, processors, sensors, antennae, audio and/or visual output devices, and/or other devices, etc.

It is to be appreciated and understood that components (e.g., communication management component, communication device, radio access network, base station, communication network, mobile communication network, data network, application server, application, anchor network component, PGW, UPF, serving network component, SGW, MME, AMF, processor component, data store, . . . ), as described with regard to a particular system or method, can include the same or similar functionality as respective components (e.g., respectively named components or similarly named components) as described with regard to other systems or methods disclosed herein.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   with regard to a data session between a device and an application, the data session having been initiated via an anchor network device while the device had been at a first location, and in response to determining that the device is at a second location, determining, by a system comprising a processor, whether an interruption of the data session is permitted based on a preference associated with the device, wherein the device is associated with the anchor network device, and wherein the anchor network device is associated with a first data network device of a first data network associated with the application and the first location;
   based on a condition associated with the data session and based on a result of the determining whether the interruption of the data session is permitted, determining, by the system, whether the device is to be connected to a serving network device that is associated with a second data network device of a second data network associated with the application, to enable the data session to continue via the serving network device instead of via the anchor network device, wherein the serving network device and the second data network are associated with the second location; and
   in response to determining that the device is to be connected to the serving network device based on the condition associated with the data session and based on the result indicating that the interruption of the data session is not permitted, connecting, by the system, the device to the serving network device, wherein a portion of data traffic of the data session is communicated between the device and the application via the serving network device without communicating the portion of the data traffic via the anchor network device.

2. The method of claim 1, further comprising:
   determining, by the system, that the interruption of the data session associated with the device is not permitted based on the preference associated with the device; and determining, by the system, that the device is to be connected to the serving network device based on the condition associated with the data session and based on the result indicating that the interruption of the data session is not permitted.

3. The method of claim 1, wherein the anchor network device is a packet data network gateway device, and wherein the serving network device is a serving gateway device that is determined to be located in proximity to the second location.

4. The method of claim 3, wherein the serving gateway device is a second serving gateway device, wherein a first serving gateway device is located in proximity to the first location and is associated with the packet data network gateway device, and wherein, prior to the device being located at the second location, the device is connected to the first serving gateway device.

5. The method of claim 1, wherein the anchor network device is an anchor user plane function device, and wherein the serving network device is a local user plane function device that is determined to be located in proximity to the device.

6. The method of claim 5, further comprising:
in response to determining that the device is to be connected to the local user plane function device based on the condition associated with the data session and based on the result indicating that the interruption of the data session is not permitted, inserting, by the system, the local user plane function device in a communication path that includes the anchor user plane function device and the device.

7. The method of claim 6, wherein the local user plane function device is a first local user plane function device, wherein the condition is a first condition, and wherein the method further comprises:
determining, by the system, that the device has moved to a third location based on location information associated with the device, wherein the location information indicates that the device is in the third location;
determining, by the system, that the device is to be connected to a second local user plane function device that is associated with a third data network device of a third data network associated with the application, based on a second condition associated with the data session, to enable the data session to continue via the second local user plane function device instead of via the anchor user plane function device;
deleting, by the system, the first local user plane function device from the communication path; and
inserting, by the system, the second local user plane function device in the communication path.

8. The method of claim 1, wherein the serving network device is a second serving network device, and wherein the method further comprises:
determining, by the system, a jitter, a latency, a packet loss, or a throughput of data traffic associated with the data session between the application and the device based on condition information relating to the condition associated with the data session, wherein the condition information is obtained by the device, the anchor network device, or a first serving network device associated with the first location, and wherein the condition comprises the jitter, the latency, the packet loss, or the throughput of the data traffic; and
determining, by the system, whether to switch the data session from the first serving network device to the second serving network device, based on the jitter, the latency, the packet loss, or the throughput.

9. The method of claim 1, further comprising:
determining, by the system, that the device is in the second location based on location information associated with the device, wherein the location information indicates that the device is in the second location, and wherein the location information comprises tracking area information, cell location information, registration area information, or geo-location information; and
determining, by the system, that the serving network device and the second data network device of the second data network are located in proximity to the second location of the device.

10. The method of claim 9, further comprising:
in response to determining that the device is in the second location, communicating, by the system, with an application device of the application in proximity to the second location to notify the application that the device is in the second location to facilitate resource allocation of an application resource of the application by the application device.

11. The method of claim 1, wherein the anchor network device is a first anchor network device, wherein the data session is a first data session, wherein the condition is a first condition, wherein the application is a first application, wherein the preference is a first preference, and wherein the method further comprises:
with regard to a second data session between the device and a second application, in response to determining that an interruption of the second data session for a defined amount of time is permitted based on a second preference associated with the device, determining, by the system, whether the device is to be redirected from the first anchor network device to a second anchor network device that is located in proximity to the second location, based on a second condition associated with the second data session, wherein the second anchor network device is associated with the second data network device of the second data network that is associated with the second application; and
in response to determining that the device is to be redirected from the first anchor network device to the second anchor network device, requesting, by the system, the device to deactivate the second data session, to facilitate terminating a first connection with the first anchor network device, and reactivate to connect with the second anchor network device via a second connection to initiate a third data session between the device and the second application.

12. A system, comprising:
a processor; and
a memory that stores executable instructions that, when executed by the processor, facilitate performance of operations, comprising:
with regard to a mobile data session between a user equipment and an application, the mobile data session established via an anchor network device while the user equipment had been at a first location, and in response to determining that the user equipment is at a second location, determining whether an interruption of the mobile data session is allowed based on an attribute associated with the user equipment, wherein the user equipment is associated with the anchor network device, and wherein the anchor network device is associated with a first data network device of a first data network associated with the application and the first location;

determining whether the user equipment is to be connected to a serving network device that is associated with a second data network device of a second data network associated with the application, based on a condition associated with the mobile data session and based on a result of the determining whether the interruption of the mobile data session is allowed, to enable the mobile data session to continue via the serving network device instead of via the anchor network device, wherein the serving network device and the second data network are associated with the second location; and in response to determining that the user equipment is to be connected to the serving network device based on the condition associated with the mobile data session and based on the result indicating that the interruption of the mobile data session is not allowed, connecting the user equipment to the serving network device, wherein a portion of data traffic of the mobile data session is communicated between the user equipment and the application via the serving network device without communicating the portion of the data traffic via the anchor network device.

13. The system of claim 12, wherein the operations further comprise:

determining that the interruption of the mobile data session associated with the user equipment is not allowed based on the attribute associated with the user equipment; and determining that the user equipment is to be connected to the serving network device based on the condition associated with the mobile data session and based on the result indicating that the interruption of the mobile data session is not allowed.

14. The system of claim 12, wherein the anchor network device is a packet data network gateway device, and wherein the serving network device is a second serving gateway device that is located in proximity to the second location, wherein a first serving gateway device is located in proximity to the first location and is associated with the packet data network gateway device, and wherein, prior to the user equipment being located at the second location, the user equipment is connected to the first serving gateway device.

15. The system of claim 12, wherein the anchor network device is a first user plane function device located in proximity to the first location, and wherein the serving network device is a second user plane function device that is located in proximity to the second location.

16. The system of claim 12, wherein the anchor network device is a first anchor network device, wherein the mobile data session is a first mobile data session, wherein the condition is a first condition, wherein the application is a first application, wherein the attribute is a first attribute, and wherein the operations further comprise:

with regard to a second mobile data session between the user equipment and a second application, in response to determining that an interruption of the second mobile data session for a defined amount of time is allowed based on a second attribute associated with the user equipment, determining whether the user equipment is to be switched from the first anchor network device to a second anchor network device that is located in proximity to the second location, based on a second condition associated with the second mobile data session, wherein the second anchor network device is associated with the second data network device of the second data network that is associated with the second application; and in response to determining that the user equipment is to be switched from the first anchor network device to the second anchor network device, requesting the user equipment to deactivate the second mobile data session, to facilitate terminating a first connection with the first anchor network device, and reactivate to connect with the second anchor network device via a second connection to initiate a third mobile data session between the user equipment and the application.

17. The system of claim 12, wherein the anchor network device is associated with a first radio access network device is associated with a first wireless coverage area that comprises the first location, wherein the serving network device is associated with a second radio access network device that is associated with a second wireless coverage area that comprises the second location, and wherein the first wireless coverage area does not overlap the second wireless coverage area.

18. A non-transitory machine-readable medium, comprising executable instructions that, when executed by a processor, facilitate performance of operations, comprising:

with regard to a data session between a wireless device and an application, the data session established via an anchor network device while the wireless device was at a first location, and in response to determining that the wireless device is at a second location, determining whether a suspension of the data session is acceptable based on a preference associated with the wireless device, wherein the wireless device is associated with the anchor network device, and wherein the anchor network device is associated with a first data network device of a first data network associated with the application and the first location;

determining whether the wireless device is to be connected to a serving network device that is associated with a second data network device of a second data network associated with the application, based on a communication condition associated with the data session and based on a result of the determining whether the suspension of the data session is acceptable, to enable the data session to continue via the serving network device rather than via the anchor network device, wherein the serving network device and the second data network are associated with the second location; and in response to determining that the wireless device is to be connected to the serving network device based on the communication condition associated with the data session and based on the result indicating that the suspension of the data session is not acceptable, connecting the wireless device to the serving network device, wherein a portion of data traffic of the data session is communicated between the wireless device and the application via the serving network device without communicating the portion of the data traffic via the anchor network device.

19. The non-transitory machine-readable medium of claim 18, wherein the operations further comprise:

determining that the suspension of the data session associated with the wireless device is not acceptable based on the preference associated with the wireless device; and determining that the wireless device is to be connected to the serving network device based on the communication condition associated with the data session and based on the result indicating that the suspension of the data session is not acceptable.

20. The non-transitory machine-readable medium of claim 18, wherein the anchor network device is a first anchor network device, wherein the data session is a first data session, wherein the communication condition is a first communication condition, wherein the application is a first application, wherein the preference is a first preference, and wherein the operations further comprise:

with regard to a second data session between the wireless device and a second application, in response to determining that a suspension of the second data session for a defined period of time is acceptable based on a second preference associated with the wireless device, determining whether the wireless device is to be redirected from the first anchor network device to a second anchor network device that is determined to be located in proximity to the second location, based on a second communication condition associated with the second data session, wherein the second anchor network device is associated with the second data network device of the second data network that is associated with the second application; and in response to determining that the wireless device is to be redirected from the first anchor network device to the second anchor network device, requesting the wireless device to deactivate the second data session, to facilitate terminating a first connection with the first anchor network device, and reactivate to connect with the second anchor network device via a second connection to initiate a third data session between the wireless device and the second application.

* * * * *